(12) United States Patent
Tseng et al.

(10) Patent No.: US 12,086,525 B2
(45) Date of Patent: Sep. 10, 2024

(54) ELECTRICALLY AWARE ROUTING FOR INTEGRATED CIRCUITS

(71) Applicant: Taiwan Semiconductor Manufacturing Company, Ltd., Hsinchu (TW)

(72) Inventors: Hsien Yu Tseng, Miaoli County (TW); Guan-Ruei Lu, Hsinchu County (TW); Wei-Ming Chen, Hsinchu (TW); Chih.Chi. Hsiao, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 346 days.

(21) Appl. No.: 17/543,443

(22) Filed: Dec. 6, 2021

(65) Prior Publication Data
US 2022/0335200 A1    Oct. 20, 2022

Related U.S. Application Data

(60) Provisional application No. 63/175,307, filed on Apr. 15, 2021.

(51) Int. Cl.
| | |
|---|---|
| *G06F 30/3953* | (2020.01) |
| *G06F 30/327* | (2020.01) |
| *G06F 30/367* | (2020.01) |
| *G06F 30/392* | (2020.01) |
| *G06F 30/398* | (2020.01) |
| *G06F 111/04* | (2020.01) |

(52) U.S. Cl.
CPC ........ *G06F 30/3953* (2020.01); *G06F 30/327* (2020.01); *G06F 30/367* (2020.01); *G06F 30/392* (2020.01); *G06F 30/398* (2020.01); *G06F 2111/04* (2020.01)

(58) Field of Classification Search
CPC .................................................. G06F 30/3953
USPC ......................................................... 716/126
See application file for complete search history.

(56) References Cited

U.S. PATENT DOCUMENTS

| | | | |
|---|---|---|---|
| 8,863,066 B1 * | 10/2014 | Kozhaya | G06F 30/394 716/126 |
| 2011/0126163 A1 * | 5/2011 | Habitz | G06F 30/3312 716/108 |
| 2015/0269302 A1 * | 9/2015 | Katta | G06F 30/394 716/120 |

* cited by examiner

*Primary Examiner* — Eric D Lee
(74) *Attorney, Agent, or Firm* — MERCHANT & GOULD P.C.

(57) ABSTRACT

A system including computer readable storage media including executable instructions and one or more processors configured to execute the executable instructions to obtain a schematic netlist and a performance specification for an integrated circuit, determine electrical constraints for nets in the schematic netlist based on the performance specification, determine physical constraints from the electrical constraints, rout the nets in the schematic netlist based on the electrical constraints and the physical constraints, and provide a data file of a layout.

20 Claims, 16 Drawing Sheets

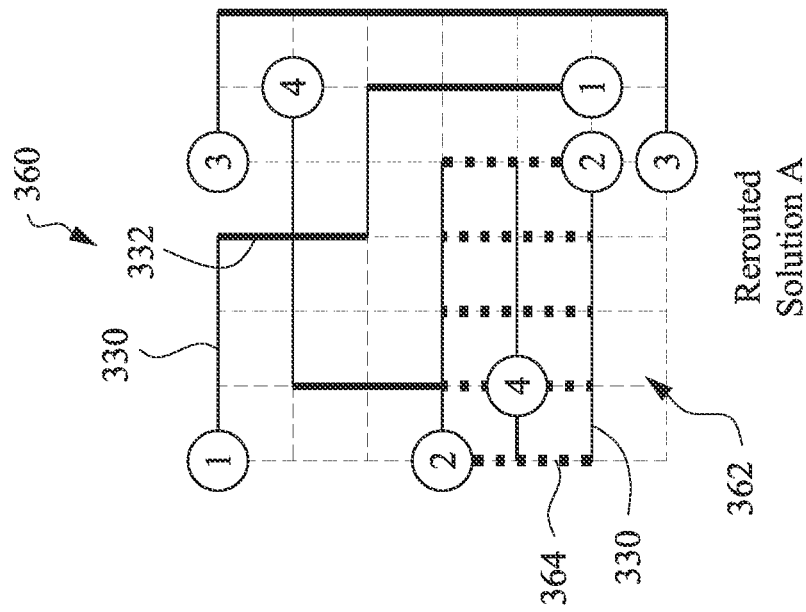
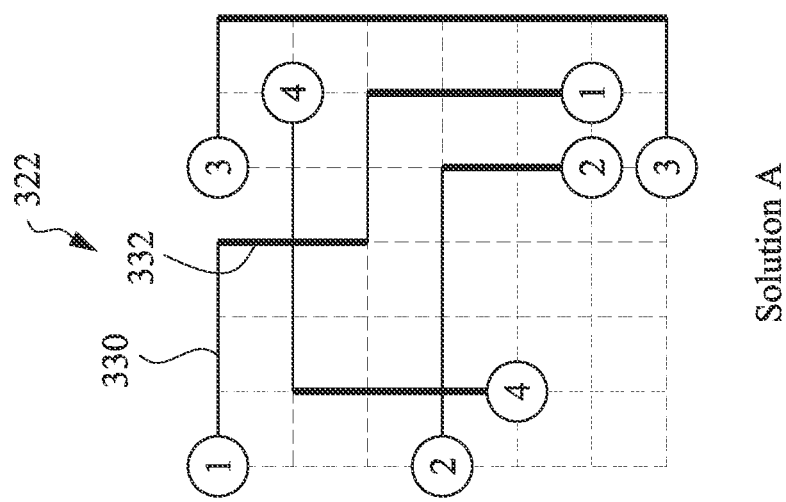
FIG. 14

ELECTRICALLY AWARE ROUTING FOR INTEGRATED CIRCUITS

CROSS-REFERENCE TO RELATED APPLICATIONS

This application claims the benefit of U.S. Provisional Patent Application No. 63/175,307, filed on Apr. 15, 2021, the disclosure of which is incorporated by reference in its entirety.

BACKGROUND

Typically, a circuit designer creates an integrated circuit (IC) design in the form of a netlist that references circuit devices to be included in the IC and that indicates which conductive net is to be connected to each device terminal. A digital circuit designer may process a netlist using a placement and routing (P&R) tool that automatically generates an IC layout, which indicates the position and orientation of each device within the IC and how conductors are to be routed within the IC. When generating the layout for the digital IC, the P&R tool treats each device as a separate cell having a predetermined internal layout. An analog circuit designer includes analog circuits in the form of components such as transistors, resistors, and other components that are laid out and connected to perform the analog functions. For example, a pair of transistors forming a differential pair may be closely matched and laid out symmetrically to properly balance the differential current. Often, P&R tools are not designed for satisfying the matching and symmetry constraints, and other constraints, of analog circuit layouts. Some P&R tools are configured to minimize distance between connections, which may create a large performance gap between pre-layout simulations and post-layout simulations leading to additional iterations of the layout and post-layout simulations. Thus, analog circuit designers often resort to manually producing layouts for analog ICs and the analog portions of mixed-signal ICs, even though hand-crafted layouts can be time-consuming and error-prone. Also, with continuous process improvements, the design rules become more complex and may impact the performance of the circuit in post-layout simulations, leading to more iterations of the layout and post-layout simulations. In addition, manual routing is highly dependent on the designer's experience and can result in increased iterations, time, and costs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

FIG. 14 is a diagram schematically illustrating a solution A rerouted to include mesh routing of net 2 in a rerouted solution A, in accordance with some embodiments.

DETAILED DESCRIPTION

Figure 1:
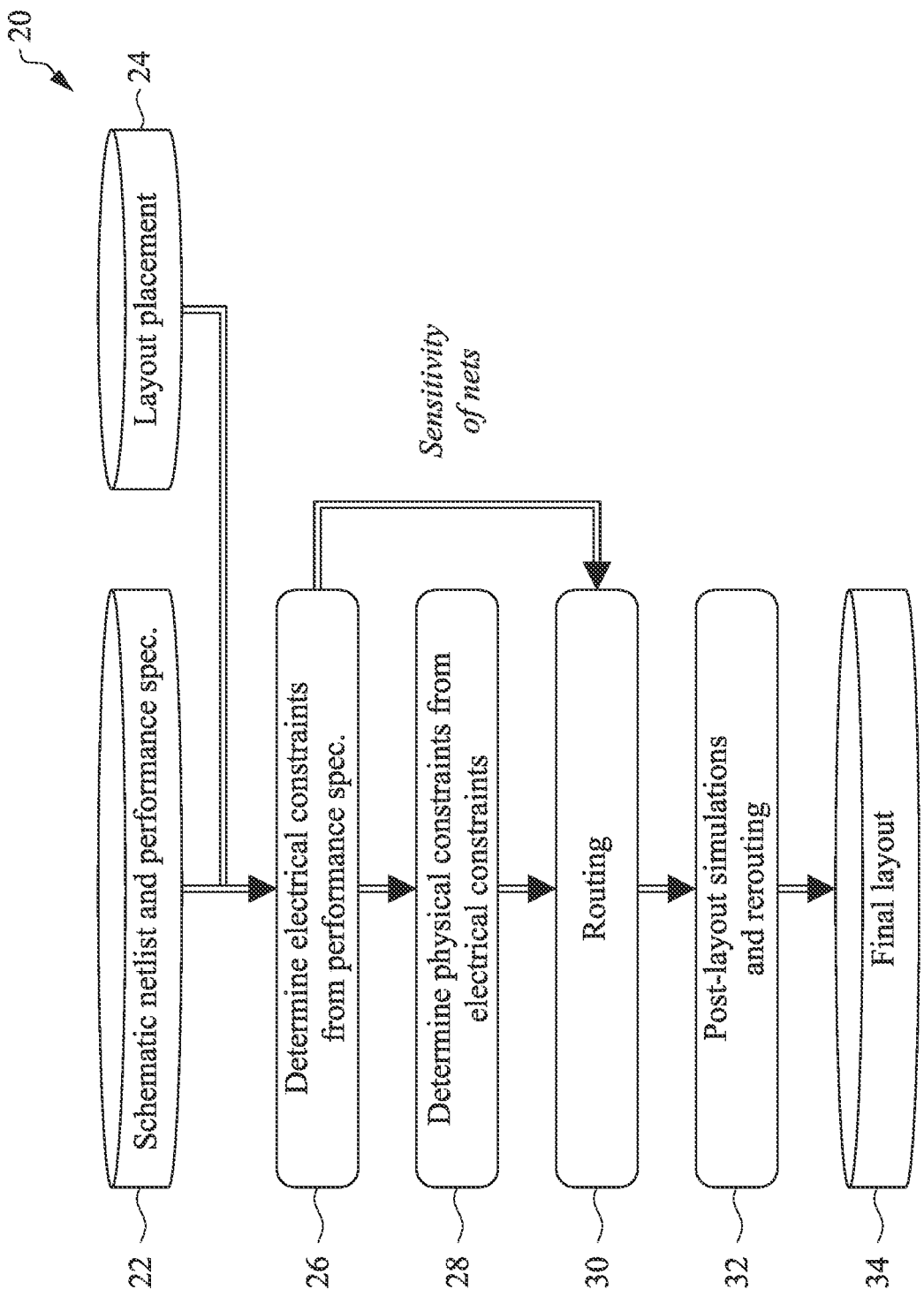
FIG. 1 is a diagram schematically illustrating an electrically aware routing flow for routing ICs that include analog circuits, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Disclosed embodiments are directed to an electrically aware routing flow that improves the efficiency of laying out ICs, such as analog ICs, where the improved layout efficiency results in shorter time-to-market, which benefits customers. In some embodiments, the electrically aware routing flow improves the efficiency of laying out analog circuits. In some embodiments, the electrically aware routing flow improves the efficiency of laying out mixed signal circuits. In some embodiments, the electrically aware routing flow improves the efficiency of laying out digital circuits.

In some embodiments, a schematic netlist and performance specification is created along with a layout placement. Electrical constraints are determined from the performance specification, and physical constraints are determined from the electrical constraints. Next, the IC is laid out based on the electrical constraints and the physical constraints and post-layout simulations are performed. Also, if needed, the layout is rerouted, and further post-layout simulations are performed.

In some embodiments, to determine electrical constraints from the performance specification, an electrical threshold test is performed for each net to find an electrical threshold value for the net that results in the IC failing to meet the performance specification. In some embodiments, the electrical threshold test includes increasing a resistance and capacitance (RC) product value to find the electrical threshold value where the IC fails to meet the performance specification. The electrical threshold value for each net is used to generate electrical constraints for the net.

In some embodiments, the electrical constraints are converted into physical constraints. For example, resistance values, electromigration (EM) current values, and capacitance values can be converted into corresponding physical constraints, such as lengths, widths, and spacing of conductive tracks in the IC. In some embodiments, other electrical constraints are converted into physical constraints.

The system may further include a sensitivity check that provides a performance impact ratio or value for each net. In some embodiments, the sensitivity check includes increasing a resistance times capacitance (RC) product value for a net until the performance of the circuit fails to meet the performance specification. Changes in the performance of the circuit for each increase in the RC product value are measured and the sensitivity for the net is determined to be the average of the changes in performance. In some embodiments, a higher sensitivity indicates a higher impact on the performance of the circuit.

In some embodiments, a schematic netlist and performance specification is created along with a layout placement. Electrical constraints for nets in the schematic netlist are determined based on the performance specification. Also, a sensitivity check that provides performance impact values for the nets in the schematic netlist is performed.

Next, the nets in the schematic netlist are routed with minimum lengths and in an order based on the performance impact values. The routing is further refined by routing the nets in the schematic netlist based on the electrical constraints, and physical constraints determined from the electrical constraints.

Disclosed embodiments include track-based routing. In track-based routing, multiple routing solutions are presented for the nets. In some embodiments, in track-based routing, a routing grid is defined for each conductive layer, such as each metal layer, where the routing grid for each conductive layer is defined by a minimum track width and/or a minimum track pitch. In some embodiments, in track-based routing, each net is routed with minimum lengths. In some embodiments, in track-based routing, each net is connected in an order based on the performance impact values of the sensitivity check.

Disclosed embodiments also include an electrical optimization process. For each net in one of the multiple routing patterns from the track-based routing process, the electrical constraint is checked. If the net does not meet the electrical constraint, at least the net is rerouted. If the rerouted net does not meet the electrical constraint, the routing pattern is skipped. Otherwise, if all nets in a routing pattern meet the electrical constraints, the routing pattern can be used as the final layout.

In some embodiments, the routing can be further refined, such as by using mesh routing, to meet the electrical constraints. In some embodiments, if a resistance value of a net violates an electrical constraint, mesh routing is applied. In some embodiments, if a capacitance value of a net violates an electrical constraint, the net width and/or spacing can be set based on feedback from a capacitance calculator. In some embodiments, if the EM current value of a net violates an electrical constraint, the net width can be adjusted and/or mesh routing can be employed to meet the electrical constraint.

Electrically aware routing improves the efficiency of laying out ICs, such as analog circuit ICs. Electrically aware routing closes the performance gap between pre-layout simulations and post-layout simulations. Also, electrically aware routing provides an efficient methodology for performing design iterations, boosting design productivity and time-to-market, and lowering the entry barrier for new customer engagement.

FIG. 1 is a diagram schematically illustrating an electrically aware routing flow 20 for routing ICs that include analog circuits, in accordance with some embodiments. The ICs that include analog circuits can be ICs that include analog circuits but not digital circuits or ICs that are mixed signal circuits, including both analog and digital circuits. In other embodiments, the electrically aware routing flow 20 can be used for routing ICs that include digital circuits but not analog circuits.

At 22, the electrically aware routing flow 20 receives or obtains a schematic netlist and a performance specification for an IC to be laid out. Also, at 24, the electrically aware routing flow 20 receives or obtains a layout placement of the circuit devices in the IC. The schematic netlist describes the IC in terms of the circuit devices, such as components and/or digital circuit cells, and the conductive tracks that connect the different circuit devices together. The conductive tracks at one node make up a net in the netlist. The schematic netlist for each analog circuit includes components, such as transistors, resistors, and capacitors, that are placed in the IC space and connected by the nets. The performance specification sets out performance requirements for the IC. In some embodiments, the performance specification includes speed requirements or frequency requirements for the IC and the nets in the netlist.

At 26, the electrically aware routing flow 20 determines electrical constraints from the performance specification for nets in the netlist. In some embodiments, at least one electrical constraint is determined for each of the nets in the netlist. In some embodiments, the electrical constraints include at least one of a resistance value, an EM current value, a capacitance value, and an RC product value. In some embodiments, the electrical constraints include other net characterizing values.

In some embodiments, to determine electrical constraints from the performance specification, an electrical threshold test is performed for each net to find an electrical threshold value for the net that results in the IC failing to meet the performance specification, such as a performance speed or frequency. As described above, in some embodiments, the electrical threshold test includes increasing an RC product value to find the electrical threshold value (RC product value) where the IC fails to meet the performance specification. The electrical threshold value for each net is used to generate electrical constraints for the net.

At 28, the electrically aware routing flow 20 determines physical constraints from the electrical constraints. For example, resistance values, EM current values, and capacitance values are converted into corresponding physical constraints, such as lengths, widths, and spacing of the conductive tracks of the nets in the netlist. In some embodiments, resistance values are converted into physical constraints using a Raphael table that indicates lengths and widths of a conductive track for providing a resistance value. In some embodiments, EM current values are converted into physical constraints using an EM inter-connection technology file or database that indicates conductive track lengths and widths for carrying currents. In some embodiments, capacitance values are converted into physical constraints using a Raphael table that indicates the lengths, widths, and spacing of conductive tracks for providing a capacitance value. In some embodiments, other electrical constraints are converted into physical constraints.

At 26, the electrically aware routing flow 20 further includes providing a sensitivity check that provides a performance impact value for each net. In some embodiments, the sensitivity check includes increasing an RC product value for a net until the performance of the circuit fails to meet the performance specification. Changes in the performance of the circuit for each increase in the RC product value are measured and the sensitivity for the net is determined to be the average of the changes in performance. In some embodiments, a higher sensitivity indicates a higher impact on the performance of the circuit.

Next, at 30, the electrically aware routing flow 20 includes routing the IC based on the electrical constraints, the physical constraints, and the sensitivities of the nets obtained from the sensitivity check. In some embodiments, the nets are routed in an order from the highest sensitivity to the lowest sensitivity.

At 32, post-layout simulations are performed and, if needed, the layout is rerouted, and further post-layout simulations are performed. At 34, the final layout is provided for creating masks and IC fabrication. In some embodiments, at 34, a data file of a layout, such as the final layout, is provided.

The electrically aware routing flow 20 decreases or lowers the layout effort as compared to manual layout procedures. Also, the electrically aware routing flow 20 lowers the performance gap between pre-layout simulations and post-layout simulations to a small or medium size performance gap as compared to a large performance gap when using a commercial analog routing tool with no automatic iteration and which may need manual modification of the layout. Also, the electrically aware routing flow 20 provides a small post-layout iteration cycle from post-layout simulations to rerouting and back to more post-layout simulations in comparison to a large post-layout iteration cycle for manual layout flows and layout flows that include commercial analog routing tools and manual rerouting.

Figure 2:
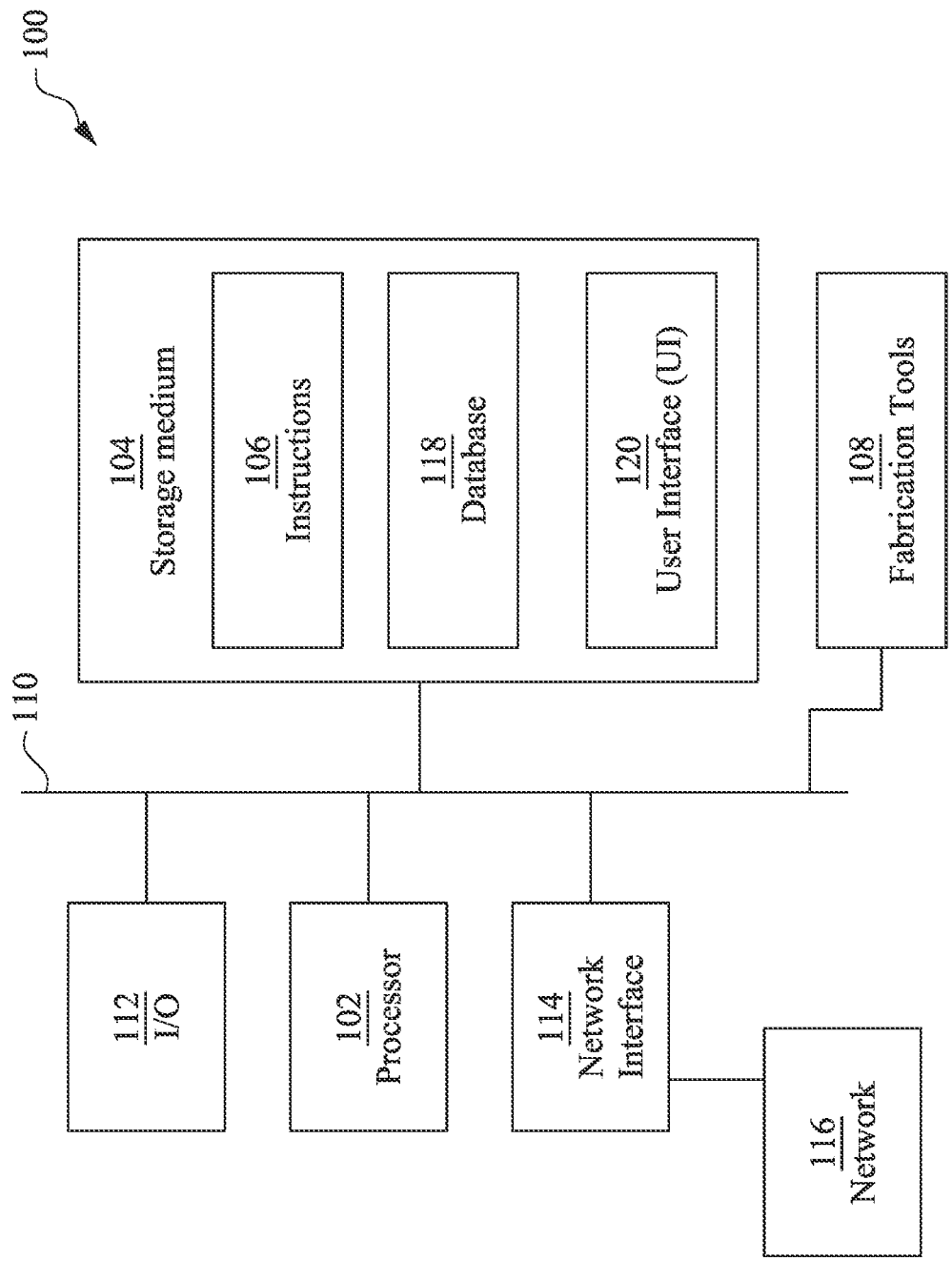
FIG. 2 is a block diagram schematically illustrating an example of a computer system configured for providing the electrically aware routing flows of this disclosure, in accordance with some embodiments.

FIG. 2 is a block diagram illustrating an example of a computer system 100 configured for providing the electrically aware routing flows of this disclosure, in accordance with some embodiments. Some or all the design and manufacture of the ICs, including the electrically aware routing of the ICs, can be performed by or with the computer system 100. In some embodiments, the computer system 100 includes an EDA system.

In some embodiments, the system 100 is a general-purpose computing device including a processor 102 and a non-transitory, computer-readable storage medium 104. The computer-readable storage medium 104 may be encoded with, e.g., store, computer program code such as executable instructions 106. Execution of the instructions 106 by the processor 102 provides (at least in part) a design tool that implements a portion or all the functions of the system 100, such as routing with the electrically aware routing flow, pre-layout simulations, post-layout simulations, rerouting of the IC, and a final layout for manufacturing. Further, fabrication tools 108 are included to further layout and physically implement the design and manufacture of the ICs. In some embodiments, the system 100 includes a commercial router. In some embodiments, the system 100 can include an automated place and route (APR) system.

The processor 102 is electrically coupled to the computer-readable storage medium 104 by a bus 110 and to an I/O interface 112 by the bus 110. A network interface 114 is also electrically connected to the processor 102 by the bus 110. The network interface 114 is connected to a network 116, so that the processor 102 and the computer-readable storage medium 104 can connect to external elements using the network 116. The processor 102 is configured to execute the computer program code or instructions 106 encoded in the computer-readable storage medium 104 to cause the system 100 to perform a portion or all of the functions of the system 100, such as providing the electrically aware routing flows described herein and other functions of the system 100. In some embodiments, the processor 102 is a central processing unit (CPU), a multi-processor, a distributed processing system, an application specific integrated circuit (ASIC), and/or a suitable processing unit.

In some embodiments, the computer-readable storage medium 104 is an electronic, magnetic, optical, electromagnetic, infrared, and/or semiconductor system or apparatus or device. For example, the computer-readable storage medium 104 can include a semiconductor or solid-state memory, a magnetic tape, a removable computer diskette, a random access memory (RAM), a read-only memory (ROM), a rigid magnetic disk, and/or an optical disk. In some embodiments using optical disks, the computer-readable storage medium 104 can include a compact disk, read only memory (CD-ROM), a compact disk read/write memory (CD-R/W), and/or a digital video disc (DVD).

In some embodiments, the computer-readable storage medium 104 stores computer program code or instructions 106 configured to cause the system 100 to perform a portion or all the functions of the system 100. In some embodiments, the computer-readable storage medium 104 also stores information which facilitates performing a portion or all the functions of the system 100. In some embodiments, the computer-readable storage medium 104 stores a database 118 that includes one or more of component libraries, digital circuit cell libraries, and databases such as a Raphael table and an EM inter-connection technology file.

The EDA system 100 includes the I/O interface 112, which is coupled to external circuitry. In some embodiments, the I/O interface 112 includes a keyboard, keypad, mouse, trackball, trackpad, touchscreen, and/or cursor direction keys for communicating information and commands to the processor 102.

The network interface 114 is coupled to the processor 102 and allows the system 100 to communicate with the network 116, to which one or more other computer systems are connected. The network interface 114 can include: wireless network interfaces such as BLUETOOTH, WIFI, WIMAX, GPRS, or WCDMA; or wired network interfaces such as ETHERNET, USB, or IEEE-1364. In some embodiments, a portion or all the functions of the system 100 can be performed in two or more systems that are like system 100.

The system 100 is configured to receive information through the I/O interface 112. The information received through the I/O interface 112 includes one or more of instructions, data, design rules, libraries of components and cells, and/or other parameters for processing by processor 102. The information is transferred to the processor 102 by the bus 110. Also, the EDA system 100 is configured to receive information related to a user interface (UI) through the I/O interface 112. This UI information can be stored in the computer-readable storage medium 104 as a UI 120.

In some embodiments, a portion or all the functions of the system 100 are implemented via a standalone software application for execution by a processor. In some embodiments, a portion or all the functions of the system 100 are implemented in a software application that is a part of an additional software application. In some embodiments, a portion or all the functions of the system 100 are implemented as a plug-in to a software application. In some embodiments, at least one of the functions of the system 100 is implemented as a software application that is a portion of an EDA tool. In some embodiments, a portion or all the functions of the system 100 are implemented as a software application that is used by the system 100. In some embodiments, a layout diagram is generated using a tool such as VIRTUOSO available from CADENCE DESIGN SYSTEMS, Inc., or another suitable layout generating tool.

In some embodiments, the electrically aware routing, layouts, and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a DVD, a magnetic disk such as a hard disk, a semiconductor memory such as a ROM and RAM, and a memory card, and the like.

As noted above, embodiments of the system 100 include fabrication tools 108 for implementing the manufacturing processes of the system 100. For example, based on the final layout, photolithographic masks may be generated, which are used to fabricate the IC by the fabrication tools 108.

Figure 3:
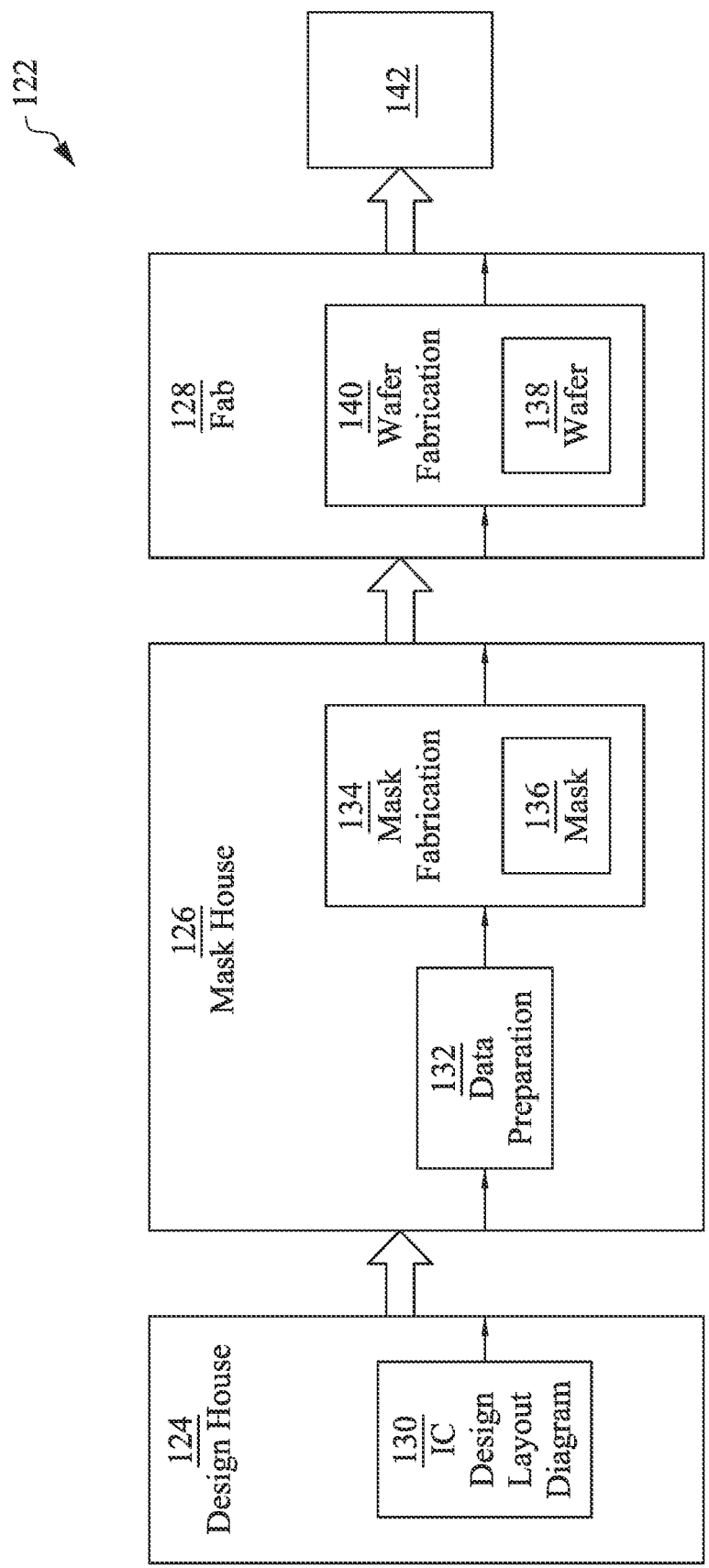
FIG. 3 is a block diagram schematically illustrating an IC manufacturing system and an IC manufacturing flow associated therewith, in accordance with some embodiments.

Further aspects of device fabrication are disclosed in conjunction with FIG. 3, which is a block diagram of an IC manufacturing system 122 and an IC manufacturing flow associated therewith, in accordance with some embodiments. In some embodiments, based on a layout diagram, one or more semiconductor masks and/or at least one component in a layer of a semiconductor IC is fabricated using the manufacturing system 122.

In FIG. 3, the IC manufacturing system 122 includes entities, such as a design house 124, a mask house 126, and an IC manufacturer/fabricator ("fab") 128, that interact with one another in the design, development, and manufacturing cycles and/or services related to manufacturing an IC, such as the ICs described herein. The entities in the system 122 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 124, the mask house 126, and the IC fab 128 are owned by a single larger company. In some embodiments, two or more of the design house 124, the mask house 126, and the IC fab 128 coexist in a common facility and use common resources.

The design house (or design team) 124 generates an IC design layout diagram 130. The IC design layout diagram 130 includes various geometrical patterns, or IC layout diagrams designed for an IC device. The geometrical patterns correspond to patterns of metal, oxide, or semiconductor layers that make up the various components of the semiconductor structures to be fabricated. The various layers combine to form various IC features. For example, a portion of the IC design layout diagram 130 includes various IC features, such as diagonal vias, active areas or regions, gate electrodes, sources, drains, metal lines, local vias, and openings for bond pads, to be formed in a semiconductor substrate (such as a silicon wafer) and in various material layers disposed on the semiconductor substrate. The design house 124 implements a design procedure to form an IC design layout diagram 130. The IC design layout diagram 130 is presented in one or more data files having information of the geometrical patterns. For example, IC design layout diagram 130 can be expressed in a GDSII file format or DFII file format. In some embodiments, the design procedure includes one or more of analog circuit design, digital logic circuit design, place and route routines including the electrically aware routing flows described herein, and physical layout designs.

The mask house 126 includes data preparation 132 and mask fabrication 134. The mask house 126 uses the IC design layout diagram 130 to manufacture one or more masks 136 to be used for fabricating the various layers of the IC or semiconductor structure. The mask house 126 performs mask data preparation 132, where the IC design layout diagram 130 is translated into a representative data file (RDF). The mask data preparation 132 provides the RDF to the mask fabrication 134. The mask fabrication 134 includes a mask writer that converts the RDF to an image on a substrate, such as a mask (reticle) 136 or a semiconductor wafer 138. The design layout diagram 130 is manipulated by the mask data preparation 132 to comply with characteristics of the mask writer and/or criteria of the IC fab 128. In FIG. 3, the mask data preparation 132 and the mask fabrication 134 are illustrated as separate elements. In some embodiments, the mask data preparation 132 and the mask fabrication 134 can be collectively referred to as mask data preparation.

In some embodiments, the mask data preparation 132 includes an optical proximity correction (OPC) which uses lithography enhancement techniques to compensate for image errors, such as those that can arise from diffraction, interference, other process effects and the like. The OPC adjusts the IC design layout diagram 130. In some embodiments, the mask data preparation 132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 132 includes a mask rule checker (MRC) that checks the IC design layout diagram 130 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 130 to compensate for limitations during the mask fabrication 134, which may undo part of the modifications performed by OPC to meet mask creation rules.

In some embodiments, the mask data preparation 132 includes lithography process checking (LPC) that simulates processing that will be implemented by the IC fab 128. LPC simulates this processing based on the IC design layout diagram 130 to create a simulated manufactured device. The processing parameters in LPC simulation can include parameters associated with various processes of the IC manufacturing cycle, parameters associated with tools used for manufacturing the IC, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 130.

The above description of mask data preparation 132 has been simplified for the purposes of clarity. In some embodiments, data preparation 132 includes additional features such as a logic operation (LOP) to modify the IC design layout diagram 130 according to manufacturing rules. Additionally, the processes applied to the IC design layout diagram 130 during data preparation 132 may be executed in a variety of different orders.

After the mask data preparation 132 and during the mask fabrication 134, a mask 136 or a group of masks 136 are fabricated based on the modified IC design layout diagram 130. In some embodiments, the mask fabrication 134 includes performing one or more lithographic exposures based on the IC design layout diagram 130. In some embodiments, an electron-beam (e-beam) or a mechanism of multiple e-beams is used to form a pattern on a mask (photomask or reticle) 136 based on the modified IC design layout diagram 130. The mask 136 can be formed in various technologies. In some embodiments, the mask 136 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 136 includes a transparent substrate (e.g., fused quartz) and an opaque material (e.g., chromium) coated in the opaque regions of the binary mask. In another example, the mask 136 is formed using a phase shift technology. In a phase shift mask (PSM) version of the mask 136, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 134 is used in a variety of processes. For example, such a mask(s) is used in an ion implantation process to form various doped regions in the semiconductor wafer 138, in an etching process to form various etching regions in the semiconductor wafer 138, and/or in other suitable processes.

The IC fab 128 includes wafer fabrication 140. The IC fab 128 is an IC fabrication business that includes one or more manufacturing facilities for the fabrication of a variety of different IC products. In some embodiments, the IC fab 128 is a semiconductor foundry. For example, there may be a manufacturing facility for the front end of line (FEOL) fabrication of a plurality of IC products, while a second manufacturing facility may provide the back end of line (BEOL) fabrication for the interconnection and packaging of the IC products, and a third manufacturing facility may provide other services for the foundry business.

The IC fab 128 uses the mask(s) 136 fabricated by the mask house 126 to fabricate the semiconductor structures or ICs 142 of the current disclosure. Thus, the IC fab 128 at least indirectly uses the IC design layout diagram 130 to fabricate the semiconductor structures or ICs 142 of the current disclosure. Also, the semiconductor wafer 138 includes a silicon substrate or other proper substrate having material layers formed thereon, and the semiconductor wafer 138 further includes one or more of various doped regions, dielectric features, multilevel interconnects, and the like (formed at subsequent manufacturing steps). In some embodiments, the semiconductor wafer 138 is fabricated by the IC fab 128 using the mask(s) 136 to form the semiconductor structures or ICs 142 of the current disclosure. In some embodiments, the IC fabrication includes performing one or more lithographic exposures based at least indirectly on the IC design layout diagram 130.

As described above, the electrically aware routing flow 20 determines electrical constraints from the performance specification for nets in the netlist. In some embodiments, the electrical constraints include at least one of a resistance value, an EM current value, a capacitance value, and an RC product value. In some embodiments, the electrical constraints include other net characterizing values.

Figure 4:
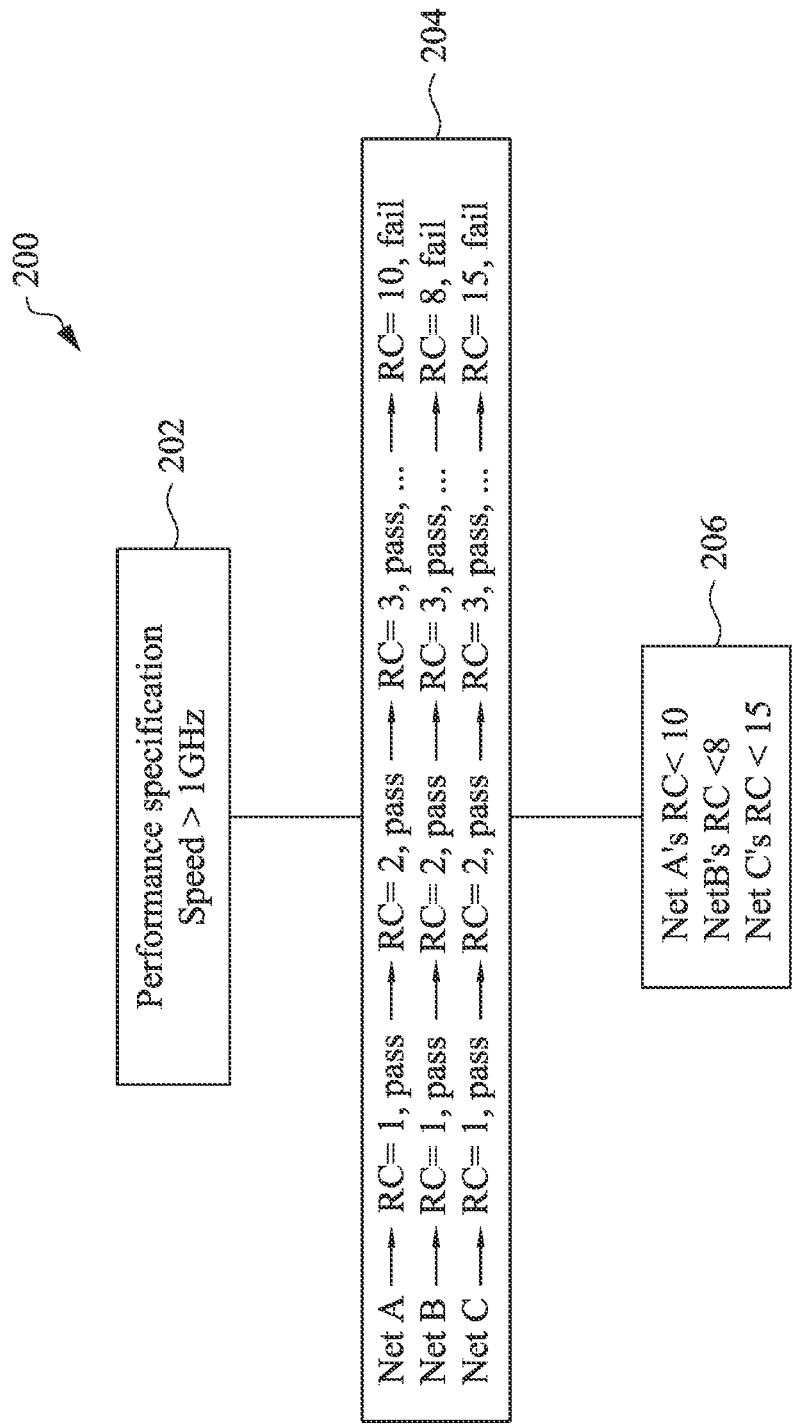
FIG. 4 is a diagram schematically illustrating an electrical threshold test for determining electrical constraints for nets from the performance specification, in accordance with some embodiments.

FIG. 4 is a diagram schematically illustrating an electrical threshold test 200 for determining electrical constraints for nets in the netlist from the performance specification, in accordance with some embodiments. In some embodiments, the electrical threshold test 200 is performed on each net in the netlist. In some embodiments, the electrical threshold test 200 is performed on selected nets in the netlist. In some embodiments, the electrical threshold test 200 is performed on nets in the netlist to find at least one electrical constraint for each of the tested nets.

The electrical threshold test 200 for a net finds an electrical threshold value for the net that results in the IC failing to meet a performance criterion from the performance specification. In the example of FIG. 4, at 202, the performance criterion from the performance specification for the IC is a speed of greater than 1 gigahertz (GHz). During the electrical threshold test, the IC is tested against this performance criterion to see if it passes or fails the test.

At 204, an RC product value is increased for the net under test. The nets are tested one net at a time and the performance of the IC is checked after each increment of the RC product value to see if the IC meets the performance criterion of 1 GHz. In some embodiments, checking the performance of the IC includes performing one or more simulations to see if the IC passes or fails the performance criterion.

If the IC meets the performance criterion, the IC passes, and the current RC product value is marked as a pass. The RC product value is incremented to a next higher value and the IC check is repeated. This continues until the IC fails to meet the performance criterion, at which point the IC fails the test and the RC product value is marked as a fail and recorded as the electrical threshold value for the net. An electrical threshold value is obtained for each of the nets that are tested.

In the example of FIG. 4, the IC passes the electrical threshold tests for net A until the RC product value has been increased to 10, the IC passes the electrical threshold tests for net B until the RC product value has been increased to 8, and the IC passes the electrical threshold tests for net C until the RC product value has been increased to 15. Thus, net A has an electrical threshold value of 10, net B has an electrical threshold value of 8 and net C has an electrical threshold value of 15. These electrical threshold values for the nets are used to generate electrical constraints for the nets.

At 206, the electrical threshold values have been used to determine electrical constraints for each of the nets A, B, and C. The electrical constraint for net A is an RC product value of less than 10, the electrical constraint for net B is an RC product value of less than 8, and the electrical constraint for net C is an RC product value of less than 15.

As described above, the electrically aware routing flow 20 further determines physical constraints from the electrical constraints. For example, the electrical constraints of resistance values, EM current values, and capacitance values are converted into corresponding physical constraints, such as lengths, widths, and spacing of the conductive paths or tracks, such as tracks of metal layers, of the nets in the netlist. In some embodiments, other electrical constraints are converted into physical constraints.

Figure 5:
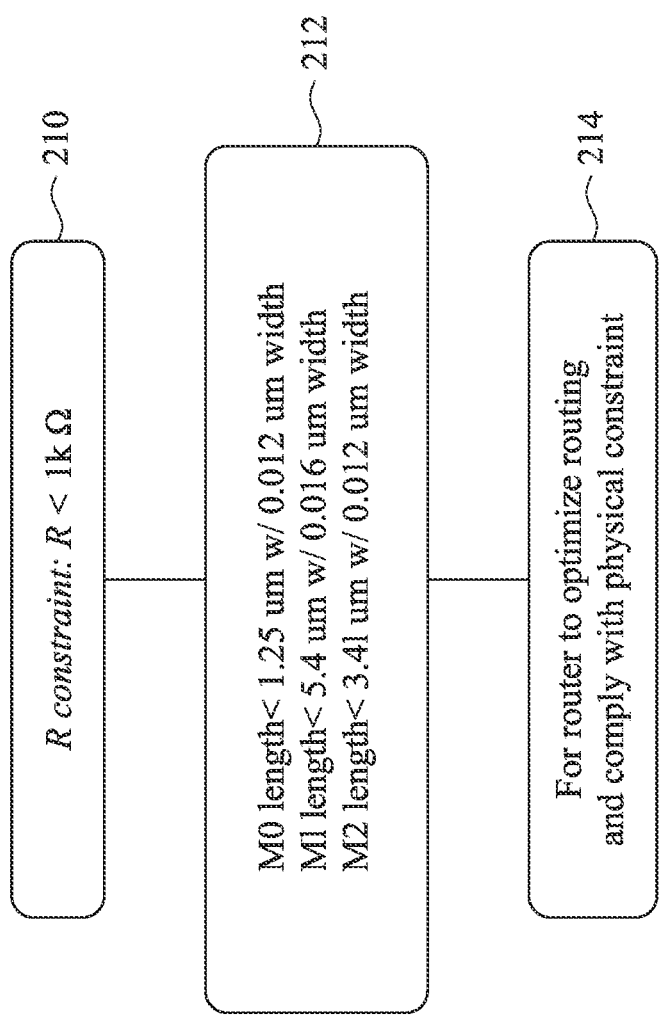
FIG. 5 is a diagram schematically illustrating the determination of physical constraints from a resistance value electrical constraint, in accordance with some embodiments.

FIG. 5 is a diagram schematically illustrating the determination of physical constraints from a resistance value electrical constraint, in accordance with some embodiments. In the example of FIG. 5, at 210, the resistance value electrical constraint is a resistance value R of less than 1 kilo-ohm.

At 212, physical constraints for tracks in metal layers M0, M1, and M2 are obtained for meeting the resistance value electrical constraint. In some embodiments, each of the tracks in the metal layers M0, M1, and M2 has a given width for the metal layer and the lengths of the tracks are obtained for meeting the resistance value electrical constraint. In some embodiments, the data is obtained based on the type of metal in the metal layer M0, M1, and M2. In some embodiments, the data is obtained from a Raphael table, such that for a given resistance value, lengths and widths are obtained for the tracks in the metal layers M0, M1, and M2. Thus, in some embodiments, resistance values are converted into physical constraints using a Raphael table that indicates lengths and widths of a conductive track for providing the resistance value.

At 212, the lengths of the tracks for the metal layers M0, M1, and M2 are listed for meeting the resistance value electrical constraint of less than 1 kilo-ohm. An M0 length of less than 1.25 micrometers (um) with a width of 0.012 um, an M1 length of less than 5.4 um with a width of 0.016 um, and a length of less than 3.41 um with a width of 0.012 um, meet the resistance value electrical constraint.

At 214, the physical constraints can be transferred to a router for complying with the physical constraints and optimizing the routing of the IC.

Figures 6, 7:
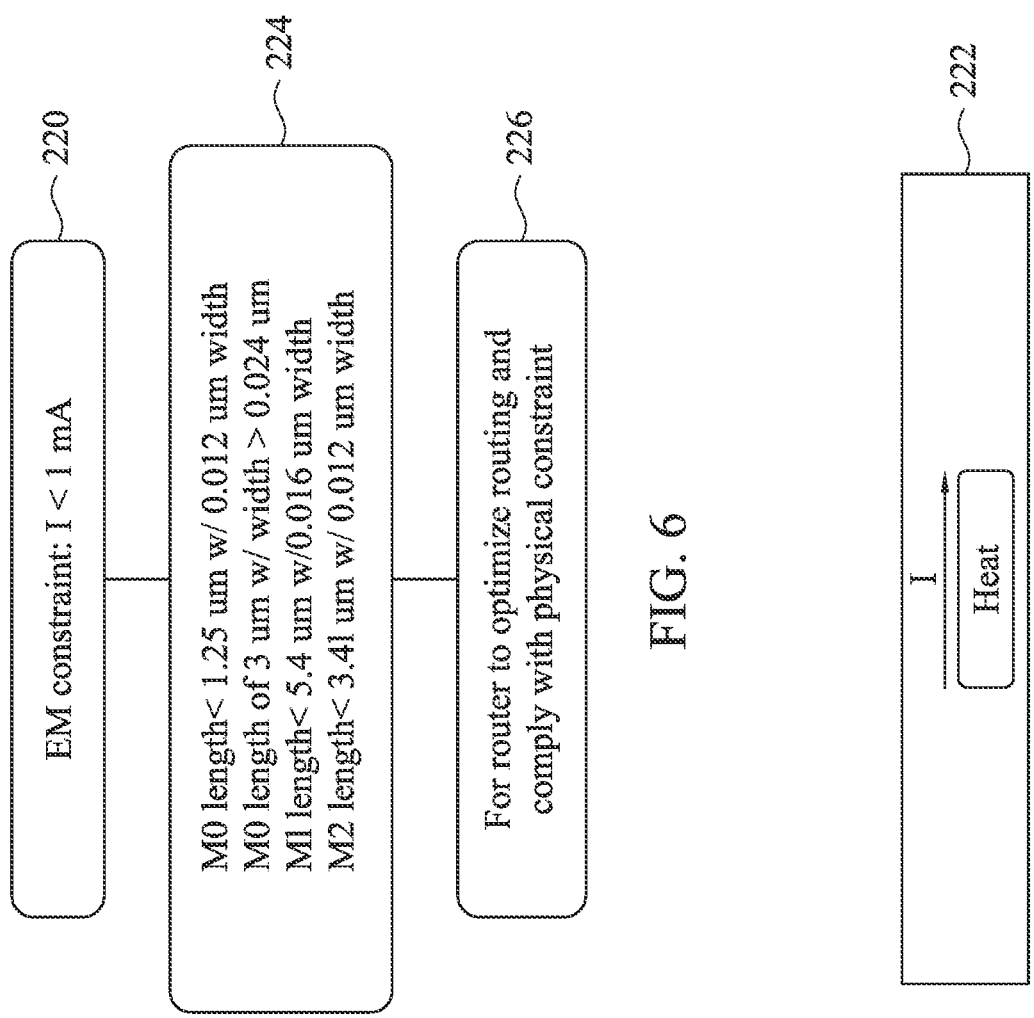
FIG. 6 is a diagram schematically illustrating a determination of physical constraints from an EM current electrical constraint, in accordance with some embodiments.
FIG. 7 is a diagram schematically illustrating the flow of current I in a conductive track, in accordance with some embodiments.

FIG. 6 is a diagram schematically illustrating determination of physical constraints from an EM current value electrical constraint, in accordance with some embodiments. In the example of FIG. 6, at 220, the EM current value electrical constraint is a current value I of less than 1 milli-ampere (mA).

FIG. 7 is a diagram schematically illustrating the flow of current I in a conductive track 222, in accordance with some embodiments. The conductive track 222 can be a track of one of the metal layers M0, M1, and M2 in the IC. The EM current I is constrained or limited to prevent excess heating and electromigration of material from the conductive track 222.

In FIG. 6, at 224, the physical constraints for tracks in metal layers M0, M1, and M2 are obtained for meeting the EM current value electrical constraint. In some embodiments, each of the tracks in the metal layers M0, M1, and M2 has a given width for that metal layer and the lengths of the tracks are obtained for meeting the EM current value electrical constraint. In some embodiments, the data is obtained based on the type of metal in the metal layer M0, M1, and M2. In some embodiments, the data is obtained from an EM inter-connection technology file, such that for a given current value, lengths and widths are obtained for tracks in the metal layers M0, M1, and M2. Thus, in some embodiments, EM current values are converted into physical constraints using an EM inter-connection technology file that indicates lengths and widths of a conductive track that satisfy the EM current electrical constraint.

At 224, the lengths of the tracks for a given width in the metal layers M0, M1, and M2 are set out for meeting the EM current value electrical constraint of less than 1 mA. An M0 length of less than 1.25 um with a width of 0.012 um, an M1 length of less than 5.4 um with a width of 0.016 um, and an M2 length of less than 3.41 um with a width of 0.012 um meet the EM current value electrical constraint. Also, an M0 width for a given length is set out for meeting the 1 mA electrical constraint, where the width needs to be greater than 0.024 um with a length of 3 um.

At 226, the physical constraints can be transferred to a router for complying with the physical constraints and optimizing the routing of the IC.

Figure 8:
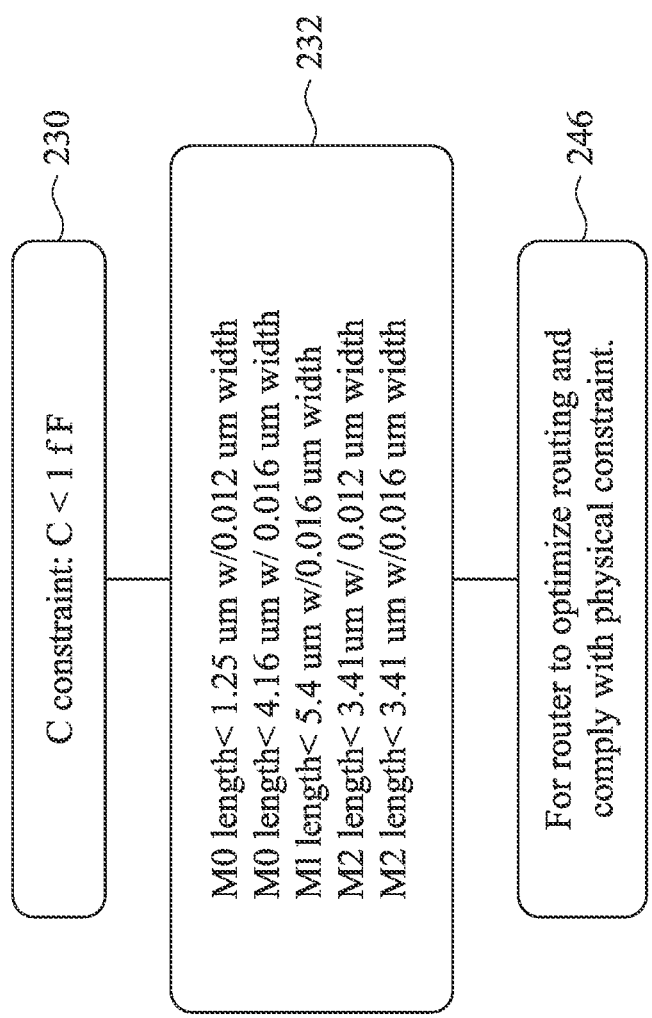
FIG. 8 is a diagram schematically illustrating a determination of physical constraints from a capacitance electrical constraint, in accordance with some embodiments.

FIG. 8 is a diagram schematically illustrating a determination of physical constraints from a capacitance value electrical constraint, in accordance with some embodiments. In the example of FIG. 8, at 230, the capacitance value electrical constraint is a capacitance value C of less than 1 femto-farad (fF).

At 232, the physical constraints for tracks in metal layers M0, M1, and M2 are obtained for meeting the capacitance value electrical constraint. In some embodiments, each of the tracks in the metal layers M0, M1, and M2 has a given width for that metal layer and the lengths of the tracks are obtained for meeting the capacitance value electrical constraint. In some embodiments, the data is obtained based on the type of metal in the metal layer M0, M1, and M2. In some embodiments, the data is obtained from a Raphael table, such that for a given capacitance value, lengths, widths, spacing, and heights are obtained for tracks in the metal layers M0, M1, and M2. Thus, in some embodiments, capacitance values are converted into physical constraints using a Raphael table that indicates the lengths, widths, spacing, and heights of conductive tracks for providing a capacitance value.

Determining the physical constraints from the capacitance value electrical constraint includes calculating a capacitance value based on physical constraints obtained as described above. The calculation of the capacitance value includes determining the capacitance value based on lengths, widths, spacing, and heights of the conductive tracks in the IC. In some embodiments, the routing shapes in a surrounding area of the IC, such as in a surrounding 1 um region, are used to calculate the capacitance value.

Figure 9:
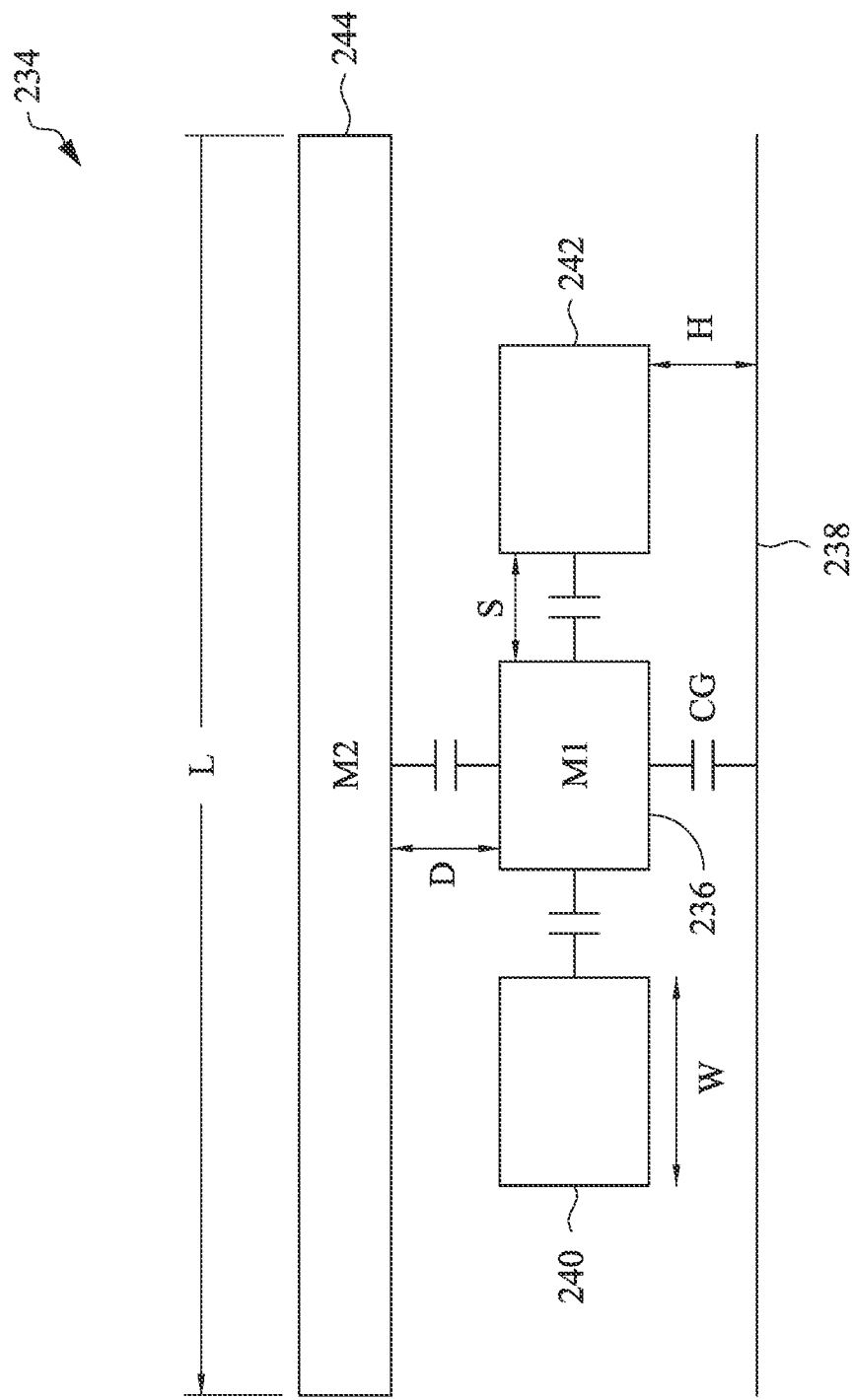
FIG. 9 is a diagram schematically illustrating an IC structure and at least some of the surrounding physical characteristics used in calculating a capacitance value for meeting the capacitance electrical constraint, in accordance with some embodiments.

FIG. 9 is a diagram schematically illustrating an IC structure 234 and at least some of the surrounding physical characteristics used in calculating a capacitance value for meeting the capacitance value electrical constraint, in accordance with some embodiments. The calculated capacitance value is a summation of a capacitance to ground (CG) and an interconnect capacitance (CC). In some embodiments, the CG is the capacitance from a conductive track 236 to a reference 238, such as ground. In some embodiments, the CC is the summation of capacitances between conductive tracks, including the capacitance between conductive tracks 236 and 240, the capacitance between conductive tracks 236 and 242, and the capacitance between conductive tracks 236 and 244. Summing together the CG and CC capacitances gives the calculated capacitance for meeting the capacitance value electrical constraint. The calculated capacitance is a function of the width W and length L of the conductive tracks 236, 240, 242, and 244, the height H of the conductive tracks 236, 240, 242, and 244 from the reference 238, and the spacing S between the conductive tracks 236, 240, 242, and 244. In some embodiments, the calculated capacitance is a function of the distance D between conductive layers of the IC. In some embodiments, the capacitance calculation is performed by a capacitance calculator. In some embodiments, the capacitance calculation is performed by a capacitance calculator that uses the physical constraints obtained from a Raphael table.

In FIG. 8 at 232, the lengths of tracks for a given width in metal layers M0, M1, and M2 are set out for being used to meet the capacitance value electrical constraint of less than 1 mA. An M0 length of less than 1.25 um with a width of 0.012 um, an M1 length of less than 5.4 um with a width of 0.016 um, and a M2 length of less than 3.41 um with a width of 0.012 um can be used for meeting the capacitance value electrical constraint. Also, an M0 length of less than 4.16 um with a width of 0.016 um, and an M2 length of less than 3.41 um with a width of 0.016 um can be used for meeting the capacitance value electrical constraint.

At 246, the physical constraints can be transferred to a router for complying with the physical constraints and optimizing the routing of the IC.

In some embodiments, the electrically aware routing flow 20 of FIG. 1 includes a sensitivity check at 26. The sensitivity check provides a performance impact ratio or value for each of the nets that are checked. The sensitivity check determines a sensitivity for each of the nets, which can be used to determine the order in which nets are laid out. In some embodiments, the net with the highest sensitivity is laid out first, followed by the net with the next highest sensitivity, and so on, down to the net with the lowest sensitivity being laid out last. In some embodiments, the performance impact value of a net is the sensitivity of the net.

Figure 10:
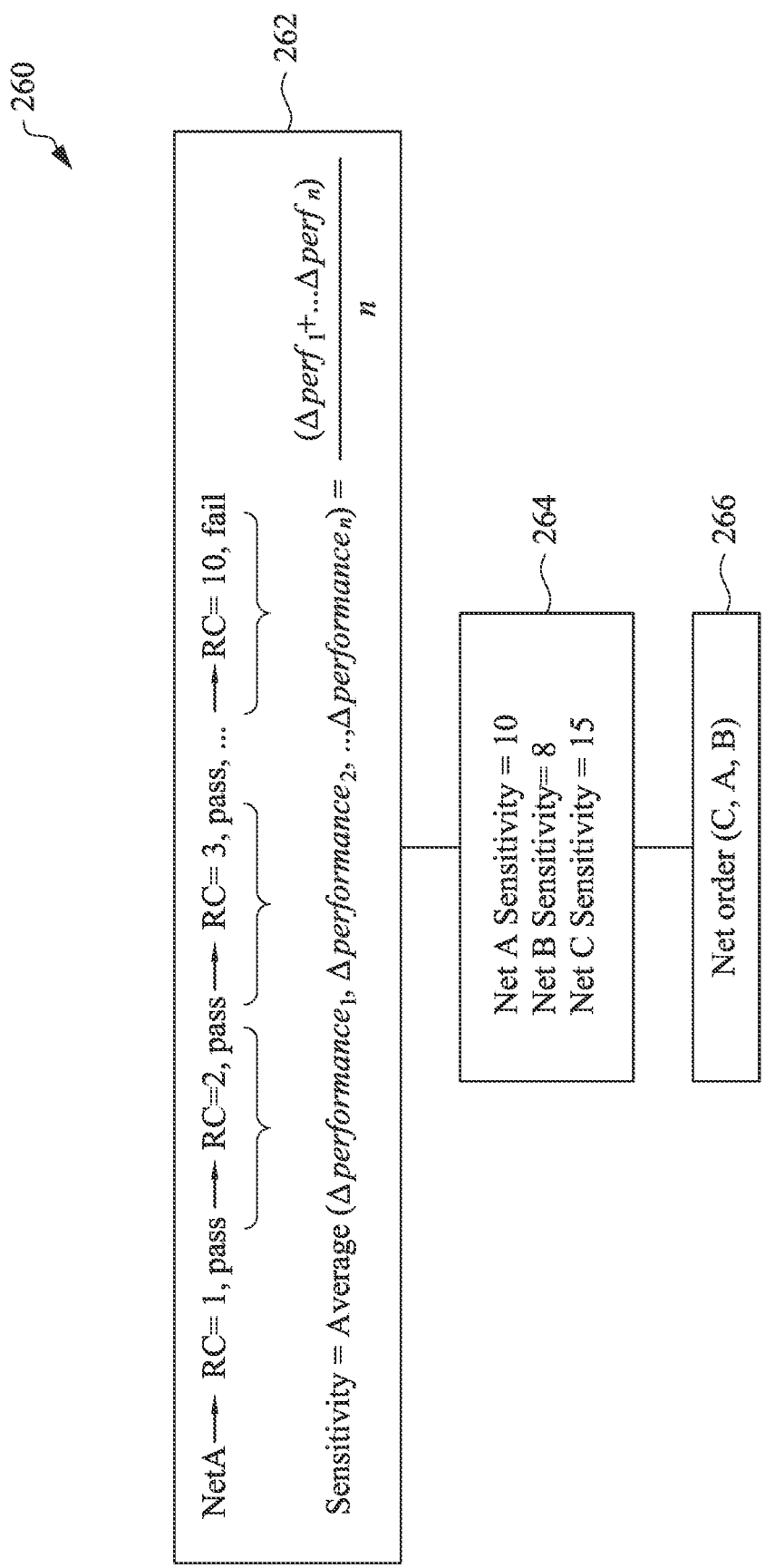
FIG. 10 is a diagram schematically illustrating a sensitivity check for determining the sensitivity of nets in the netlist, in accordance with some embodiments.

FIG. 10 is a diagram schematically illustrating a sensitivity check 260 for determining a sensitivity of nets in the netlist, in accordance with some embodiments. The sensitivity check 260 finds the sensitivity and a performance impact value for each of the nets that are checked, where a higher sensitivity indicates a higher impact on the performance of the IC. In some embodiments, the sensitivity check 260 is performed on each net in the netlist. In some embodiments, the sensitivity check 260 is performed on selected nets in the netlist. In some embodiments, the sensitivity is the performance impact value.

In the example of FIG. 10, at 262, the sensitivity check 260 includes increasing an RC product value for a net until the performance of the IC fails to meet a performance criterion from the performance specification. During the sensitivity check 260, the performance of the IC is checked against the performance criterion at each of the different RC product values, such as by simulations. If the IC meets the performance criterion, the RC product value is marked as a pass. If the IC does not meet the performance criterion, the RC product value is marked as a fail. In some embodiments, the performance criterion from the performance specification for the IC can be a speed or frequency, such as a speed of greater than 1 GHz.

The nets are checked one net at a time and the performance of the IC is measured after each increment or change in the RC product value. In some embodiments, checking the performance of the IC includes performing one or more simulations to see if the IC passes or fails the performance criterion.

If the IC meets the performance criterion, the IC passes, and the current RC product value is marked as a pass. The RC product value is then incremented to a next higher value and the IC is checked again. This continues until the IC fails to meet the performance criterion, at which point the IC fails the test and the RC product value is marked as a fail. This is done for each of the nets being tested. In the example of FIG. 10, the IC passes for net A until the RC product value has been increased to 10.

In the sensitivity check 260, at each increment or change in the RC product value, the performance of the IC is measured and the change or delta in performance of the IC from one RC product value to the next RC product value is recorded. These deltas in the performance of the IC for each increase in the RC product value are averaged to determine the sensitivity of a net.

At 264, the sensitivities of the nets are listed. The sensitivity of net A is 10, the sensitivity of net B is 8, and the sensitivity of net C is 15. Thus, net C has the highest sensitivity and Net B has the lowest sensitivity. At 266, a routing order is set based on the sensitivity of the nets, where net C is routed first, followed by net A, followed by net B.

Using the above-described tools, the electrically aware routing flow 20 decreases or lowers the layout effort as compared to manual layout procedures, lowers the performance gap between pre-layout simulations and post-layout simulations as compared to using a commercial analog routing tool, and provides a small post-layout iteration cycle from post-layout simulations to rerouting and back to post-layout simulations.

Figure 11:
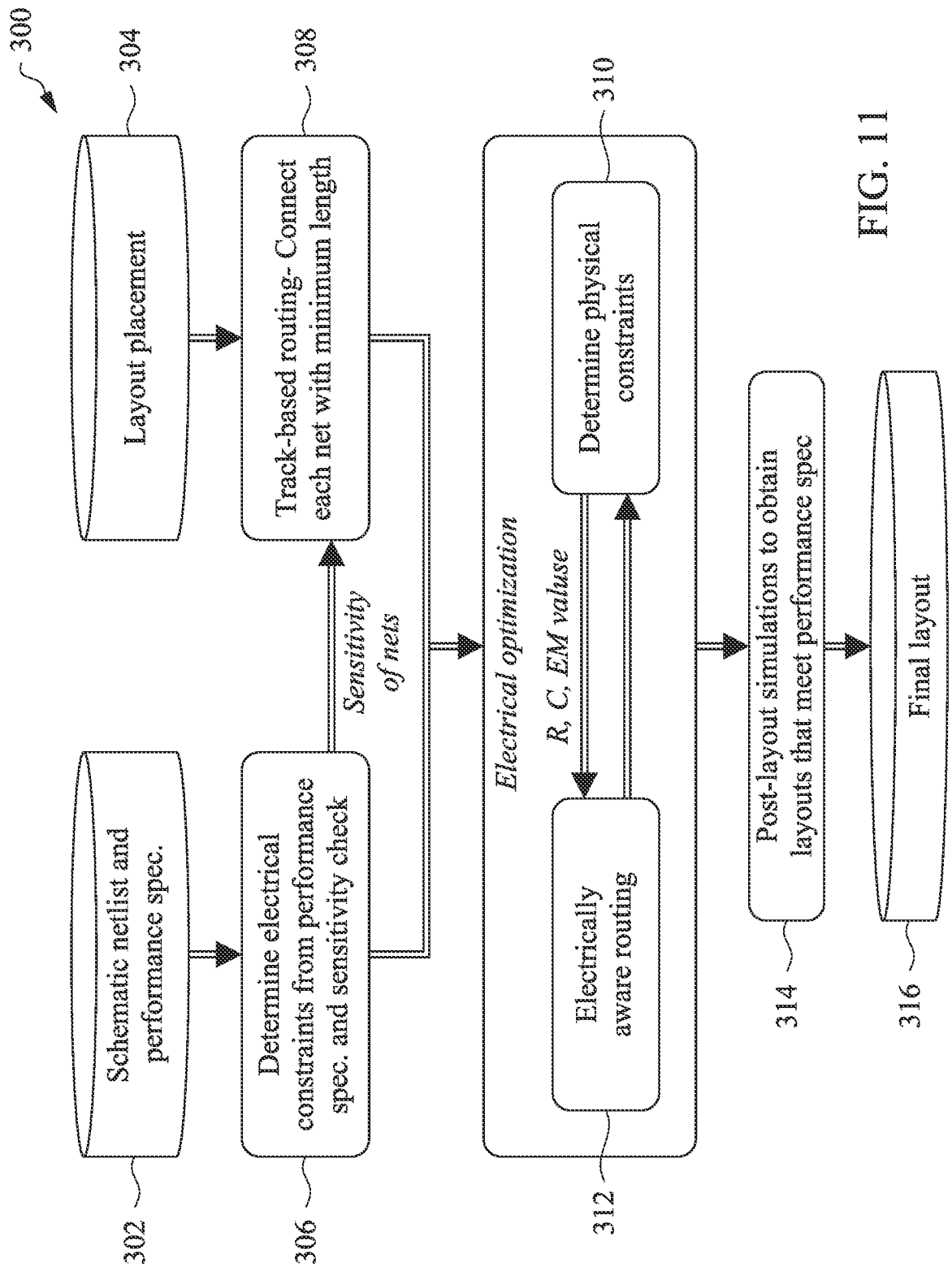
FIG. 11 is a diagram schematically illustrating another electrically aware routing flow for routing ICs that include analog circuits, in accordance with some embodiments.

FIG. 11 is a diagram schematically illustrating another electrically aware routing flow 300 for routing ICs that include analog circuits, in accordance with some embodiments. The ICs that include analog circuits can be ICs that include analog circuits but not digital circuits or ICs that are mixed signal circuits, including both analog and digital circuits. In other embodiments, the electrically aware routing flow 300 can be used for routing ICs that include digital circuits but not analog circuits.

The electrically aware routing flow 300 can be performed in part or completely by the computer system 100 of FIG. 2. Also, some or all the design and manufacture of the ICs, including the electrically aware routing of the ICs, can be performed by the computer system 100. In addition, the IC manufacturing system 122 and the IC manufacturing flow associated therewith of FIG. 3 can be used to manufacture ICs designed using the electrically aware routing flow 300.

At 302, the electrically aware routing flow 300 receives or obtains a schematic netlist and a performance specification for an IC to be laid out. Also, at 304, the electrically aware routing flow 300 receives or obtains a layout placement of the circuit devices in the IC. The schematic netlist describes the IC in terms of the circuit devices, such as components and/or digital circuit cells, and the conductive tracks that connect the circuit devices. The conductive tracks at one node make up a net in the netlist. The schematic netlist for each analog circuit includes components, such as transistors, resistors, and capacitors, that are placed in the IC space and connected by the nets. The performance specification sets out performance requirements for the IC. In some embodiments, the performance specification includes speed requirements and/or frequency requirements for the IC and the nets in the netlist.

At 306, the electrically aware routing flow 300 determines electrical constraints from the performance specification for nets in the netlist. In some embodiments, at least one electrical constraint is determined for each of the nets in the netlist. In some embodiments, the electrical constraints include at least one of a resistance value, an EM current value, a capacitance value, and an RC product value. In some embodiments, the electrical constraints include other net characterizing values. In some embodiments, the electrically aware routing flow 300 at 306 is like the electrically aware routing flow 20 at 26.

In some embodiments, at 306, to determine electrical constraints from the performance specification, an electrical threshold test is performed for each net to find an electrical threshold value for the net that results in the IC failing to meet the performance specification, such as a performance speed or frequency. As described above, in relation to electrical threshold test 200 of FIG. 4, in some embodiments, the electrical threshold test includes increasing an RC product value to find the electrical threshold value (RC product value) where the IC fails to meet the performance specification. This electrical threshold value for a net is then used to generate electrical constraints for the net. In some embodiments, the electrical threshold test at 306 is like the electrical threshold test 200 of FIG. 4.

At 306, the electrically aware routing flow 300 further includes providing a sensitivity check that provides a sensitivity and a performance impact value for each net. In some embodiments, the sensitivity check includes increasing an RC product value for a net until the performance of the circuit fails to meet a performance criterion of the performance specification. Changes or deltas in the performance of the circuit for each increase in the RC product value are measured and the sensitivity for a net is determined to be the average of these deltas in performance. In some embodiments, a higher sensitivity indicates a higher impact on the performance of the circuit. In some embodiments, the performance impact value of a net is the sensitivity of the net. In some embodiments, the sensitivity check at 306 is like the sensitivity check 260 of FIG. 10.

At 308, the electrically aware routing flow 300 includes track-based routing. In track-based routing, a routing grid is defined at each conductive layer, such as at each metal layer, using the minimum track width and the minimum track pitch for the layer. The circuit devices, including components and cells, are connected using minimum length nets and the sensitivity values and/or performance impact values are transmitted to the track-based routing and used to determine the routing order of the nets. The track-based routing at 308 provides one or more routing solutions to be used in the electrically aware routing flow 300.

At 310, the electrically aware routing flow 300 determines physical constraints from the electrical constraints. For example, resistance values, EM current values, and capacitance values are converted into corresponding physical constraints, such as lengths, widths, spacing, and heights of the conductive tracks. In some embodiments, resistance values are converted into physical constraints using a Raphael table that indicates lengths and widths of a conductive track for providing a resistance value. In some embodiments, EM current values are converted into physical constraints using an EM inter-connection technology file or database that indicates conductive track lengths and widths for carrying currents. In some embodiments, capacitance values are converted into physical constraints using a Raphael table that indicates lengths, widths, spacing, and heights of conductive tracks for providing a capacitance value. In some embodiments, other electrical constraints are converted into physical constraints.

In some embodiments, physical constraints are determined from a resistance value electrical constraint as shown and described in relation to FIG. 5. In some embodiments, physical constraints are determined from an EM current value electrical constraint as shown and described in relation to FIG. 6. In some embodiments, physical constraints are determined from a capacitance value electrical constraint as shown and described in relation to FIG. 8.

At 312, the electrically aware routing flow 300 includes electrically aware routing based on the electrical constraints, the physical constraints, and the sensitivities and/or performance impact values of the nets obtained from the sensitivity check. The electrically aware routing at 312 includes rerouting layouts provided through the track-based routing at 308.

The electrically aware routing at 312 determines whether the nets meet the electrical constraints. If a net does not meet the electrical constraint(s) for the net, the electrically aware routing 312 reroutes the net and, in some embodiments, the IC. The rerouted net is then checked to determine whether the net meets the electrical constraint(s). If the rerouted net does not meet the electrical constraint(s), the routing pattern (layout) is rejected. If all nets meet the electrical constraints, the layout is accepted as one possible final layout.

At 314, post-layout simulations are performed to check the layouts and obtain layouts that meet the performance specification. At 316, a final layout is provided for creating masks and IC fabrication. In some embodiments, at 316, a data file of a layout, such as the final layout, is provided.

The electrically aware routing flow 300 with the electrically aware routing 312 decreases or lowers the layout effort as compared to manual layout procedures, lowers the performance gap between pre-layout simulations and post-layout simulations to a small or medium size performance gap as compared to a large performance gap when using a commercial analog routing tool, and it provides a small post-layout iteration cycle from post-layout simulations to rerouting and back to post-layout simulations in comparison to a large post-layout iteration cycle for manual layout flows and layout flows that include commercial analog routing tools.

Figure 12:
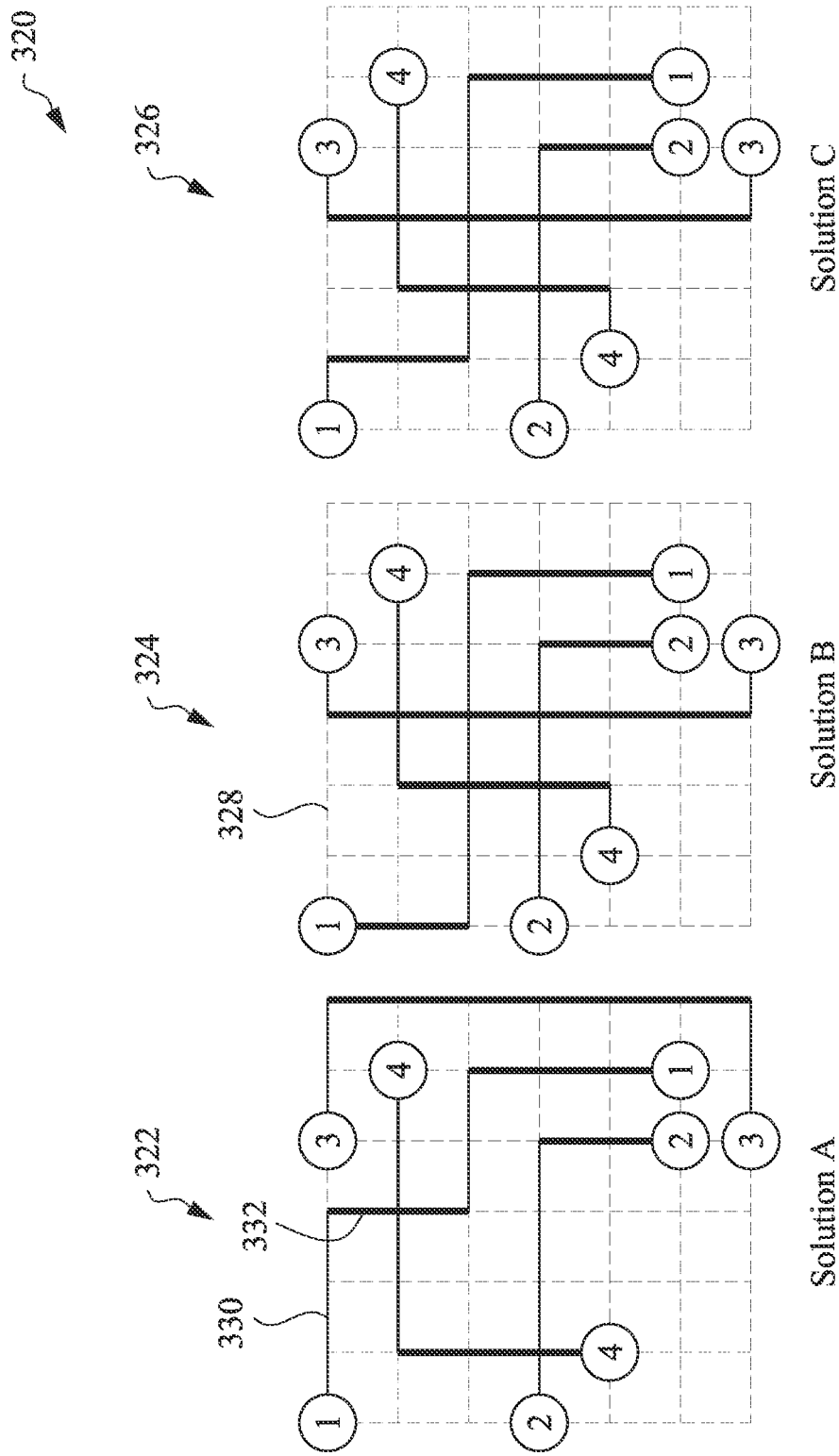
FIG. 12 is a diagram schematically illustrating track-based routing solutions or layouts, in accordance with some embodiments.

FIG. 12 is a diagram schematically illustrating track-based routing solutions or layouts 320, in accordance with some embodiments. In the electrically aware routing flow 300, the routing solutions 320 were generated at 308 and used as a starting point for the electrically aware routing at 312. The track-based routing solutions 320, include three routing solutions of solution A at 322, solution B at 324, and solution C at 326.

The track-based routing at 308 is performed using a routing grid 328 that is defined at each conductive layer, such as at each metal layer, with the minimum track width and the minimum track pitch for that layer. In FIG. 12, the routing grid 328 is indicated in dashed lines.

In the example of FIG. 12, the track-based routing grid 328 includes at least two conductive layers: one conductive layer 330 has tracks in the horizontal direction and another conductive layer 332 has tracks in the vertical direction. Four nets labeled 1-4 are laid out on the routing grid 328 in each of the routing solutions 320. In some embodiments, the conductive layer 330 is first metal layer M0 and the conductive layer 332 is second metal layer M1.

In some embodiments, the track-based routing at 308 includes connecting circuit devices, such as components and cells, using minimum length nets. Also, in some embodiments, the track-based routing at 308 includes using sensitivity values and/or performance impact values to determine the routing order of the nets 1-4.

Figure 13:
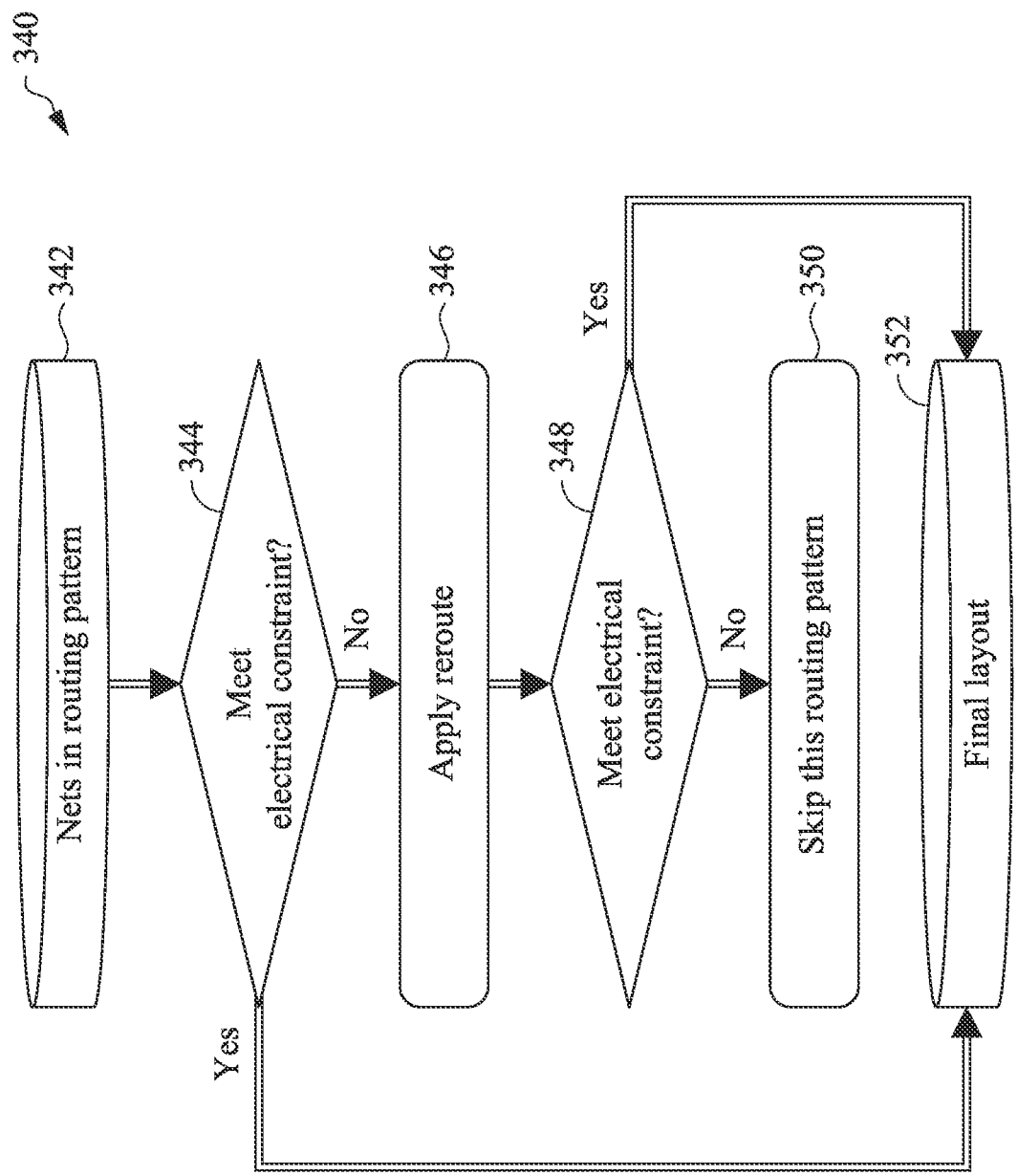
FIG. 13 is a diagram schematically illustrating electrical constraint routing in the electrically aware routing of FIG. 11, in accordance with some embodiments.

FIG. 13 is a diagram schematically illustrating electrical constraint routing 340 in the electrically aware routing at 312 in FIG. 11, in accordance with some embodiments. The electrical constraint routing 340 includes checking the nets in a routing pattern or layout against electrical constraints and, if needed, rerouting a portion or all the layout. In some embodiments, the layouts include the routing solutions 320 provided by the track-based routing at 308.

At 342, the electrical constraint routing 340 includes receiving or obtaining the nets in a routing pattern, such as one of the routing solutions 320. The electrical constraint routing 340 includes checking whether the nets in the routing pattern meet their corresponding electrical constraint(s). In some embodiments, each net is checked, one net at a time. In some embodiments, all nets in a routing pattern or layout are checked.

At 344, the electrical constraint routing 340 includes checking each net by determining whether the net meets the electrical constraint(s) for that net. If a net does not meet the electrical constraint(s) for that net, the net and, in some embodiments, the entire IC is rerouted at 346.

At 348, the rerouted net is checked by determining if the net meets the electrical constraint(s) for that net. If the rerouted net does not meet the electrical constraint(s), the routing pattern is rejected at 350. In some embodiments, if all nets in the layout pattern meet the electrical constraints for the nets at 344 or 348, the layout is accepted as one possible final layout at 352. In some embodiments, if at least a group of selected nets in the layout pattern meet the electrical constraints for the selected nets at 344 or 348, the layout is accepted as one possible final layout at 352.

FIG. 14 is a diagram schematically illustrating solution A at 322 rerouted to include mesh routing of net 2 in rerouted solution A at 360, in accordance with some embodiments. The rerouted solution A at 360 includes nets 1, 3, and 4 with the same routing as in solution A at 322 and net 2 rerouted to include mesh routing.

Net 2 is routed the same in each of the track-based routing solutions 320, including solution A at 322, solution B at 324, and solution C at 326. In electrical constraint routing 340, each of the track-based routing solutions 320 is checked and at 344 each of the nets 1-4 in each of the track-based routing solutions 320 is checked against their corresponding electrical constraints. In each of the track-based routing solutions 320, net 2 is the same and, in the example of FIG. 14, net 2 fails one or more of the resistive electrical constraint(s) and/or the EM current electrical constraint(s). Since net 2 does not meet the electrical constraints for the net, at least net 2 is rerouted at 346.

In some embodiments, the rerouting of net 2 at 346 includes mesh routing. In mesh routing, multiple conductive paths are connected between points in the net to provide a conductive mesh between the points.

In the example of FIG. 14, conductive layer 330 is first metal layer M0 routed horizontally and conductive layer 332 is second metal layer M1 routed vertically. The mesh routing of net 2 at 362 includes conductive layer 330, which is first metal layer M0, routed horizontally and another conductive layer 364, which is a third metal layer M2, routed vertically to provide the mesh structure at 362. The conductive layer 364 and the conductive layer 332 are different layers in the IC. This mesh structure at 362 in the rerouted solution A at 360 has a lower resistance value than net 2 of solution A at 322 and can accommodate a higher EM current than net 2 of solution A at 322.

Also, solution B at 324 and solution C at 326 cannot include a mesh structure like the mesh structure at 362. In each of solution B at 324 and solution C at 326, net 4 includes a conductive layer 330 track that interferes with the horizontal conductive paths 330 in the mesh routing. Thus, each of solution B at 324 and solution C at 326 fails the electrical constraint check at 344 for net 2 and cannot be rerouted with the mesh routing 362 to pass the electrical constraints. Only, solution A at 328 can be rerouted with the mesh routing of net 2 to provide rerouted solution A at 360.

At 348, the rerouted solution A at 360 including the mesh routed net 2 is checked by determining if the mesh routed net 2 meets the electrical constraint(s) for the net. If the mesh routed net 2 passes the electrical constraint(s), then the layout may be accepted as a final layout option at 352. If the mesh routed net 2 does not meet the electrical constraint(s), then solution A is rejected at 350.

Figure 15:
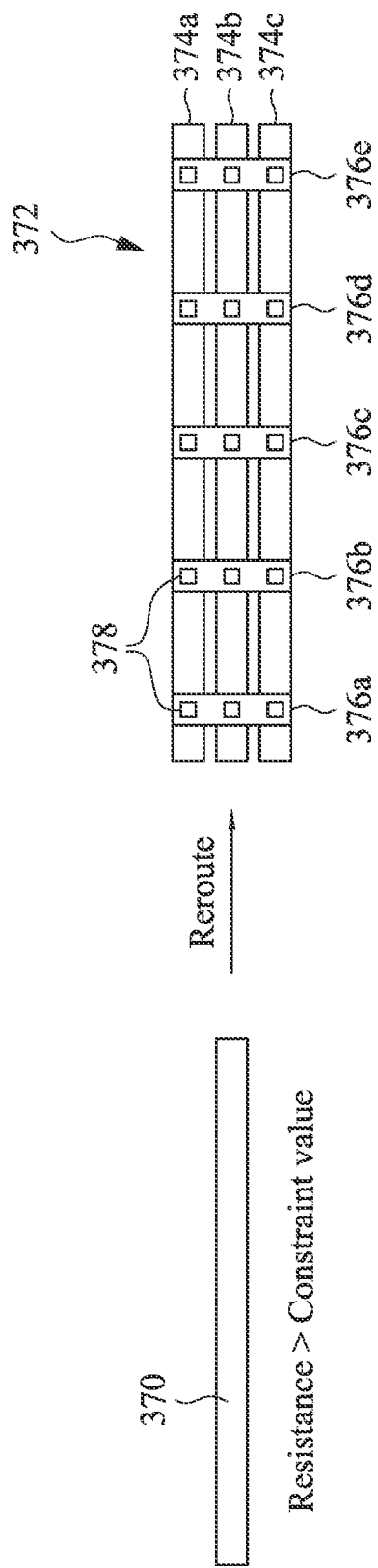
FIG. 15 is a diagram schematically illustrating a net rerouted to a mesh routed net to meet resistance electrical constraints, in accordance with some embodiments.

FIG. 15 is a diagram schematically illustrating a net 370 rerouted to a mesh routed net 372 to meet resistance electrical constraints, in accordance with some embodiments. In this example, the net 370 was checked against resistance electrical constraints and found to have a resistance value that is greater than one or more of the resistance electrical constraint values.

Net 370 was then rerouted to the mesh routed net 372 for meeting the resistance electrical constraint values. The mesh routed net 372 includes three conductive paths 374a-374c from one conductive layer connected through five conductive paths 376a-376e from another conductive layer and vias 378. The resulting resistance of mesh routed net 372 is lower than the resistance of net 370 and, in some embodiments, less than all resistance electrical constraints for the mesh routed net 372.

Figure 16:
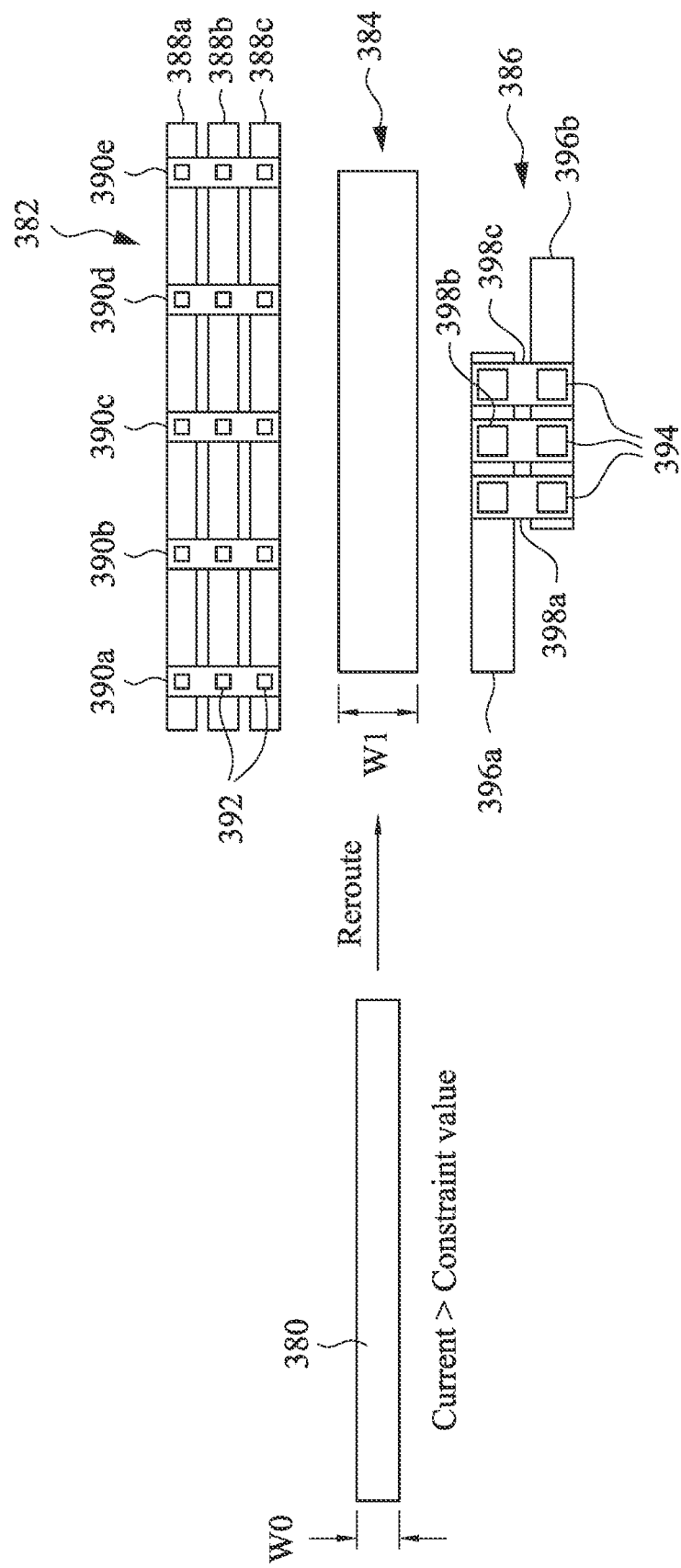
FIG. 16 is a diagram schematically illustrating a net rerouted to one of a mesh routed net, a wider net, or a multiple via net to meet EM current electrical constraints, in accordance with some embodiments.

FIG. 16 is a diagram schematically illustrating a net 380 rerouted to one of a mesh routed net 382, a wider net 384, and a multiple via net 386 to meet EM current electrical constraints, in accordance with some embodiments. In this example, the net 380 was checked against EM current electrical constraints and found to be carrying a current that exceeds the EM current electrical constraints for the net 380. To remedy this situation net 380 can be rerouted to one of the mesh routed net 382, the wider net 384, and the multiple via net 386.

Net 380 can be rerouted to the mesh routed net 382 for meeting the EM current electrical constraint values. The mesh routed net 382 includes three conductive paths 388a-388c from one conductive layer connected through five conductive paths 390a-390e from another conductive layer and vias 392. The resulting mesh routed net 382 can carry more current and meet the EM current electrical constraints for the circuit.

Net 380 can be rerouted to the wider net 384 for meeting the EM current electrical constraint values. The wider net 384 has a width W1 that is greater than the width W0 of the net 380. The resulting wider net 384 can carry more current and meet the EM current electrical constraints for the circuit.

In some embodiments, the net 380 may need additional vias 394 connecting multiple first conductors 396a and 396b to meet the EM current electrical constraints. The net 386 includes the first conductors 396a and 396b connected by second conductors 398a-398b through the vias 394.

Each of the three rerouted nets 382, 384, and 386 can be used in situations to reroute net 380 and meet the EM current electrical constraints. In some embodiments, one of the rerouted nets 382, 384, and 386 is automatically selected by the system.

In some embodiments, if a net does not meet a capacitance electrical constraint, the conductive path width W, spacing S, height H, and distance D as illustrated in FIG. 9, can be adjusted using feedback from the capacitance calculator.

Figure 17:
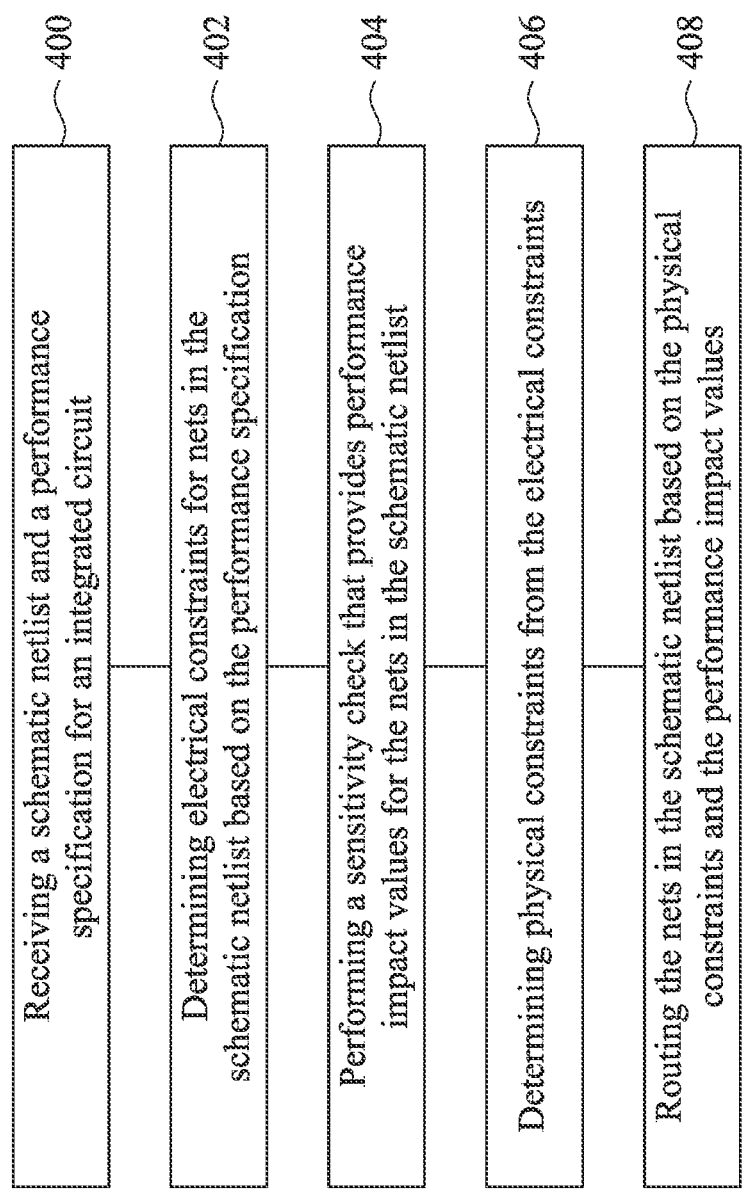
FIG. 17 is a flow-chart diagram schematically illustrating a method of routing an IC, in accordance with some embodiments.

FIG. 17 is a flow-chart diagram schematically illustrating a method of routing an IC, in accordance with some embodiments. In some embodiments, the method is like the electrically aware routing flow 20 of FIG. 1. In some embodiments, the method is like the electrically aware routing flow 300 of FIG. 11.

At 400, the method includes receiving a schematic netlist and a performance specification for the integrated circuit. Also, in some embodiments, the method includes receiving a layout placement of the circuit devices in the IC. The schematic netlist describes the IC in terms of the circuit devices, such as components and/or digital circuit cells, and the conductive tracks that connect the circuit devices together. The performance specification sets out the performance requirements for the IC.

At 402, the method includes determining electrical constraints for the nets in the schematic netlist based on the performance specification. In some embodiments, the electrical constraints include at least one of a resistance value, an EM current value, a capacitance value, and an RC product value. In some embodiments, the electrical constraints include other net characterizing values.

In some embodiments, determining electrical constraints for nets in the schematic netlist includes determining electrical threshold values for the nets in the schematic netlist for meeting the performance specification. In some embodiments, this includes performing an electrical threshold test on each net to find an electrical threshold value for the net that results in the IC failing to meet the performance specification. In some embodiments, the electrical threshold test includes increasing an RC product value to find the electrical threshold value (RC product value) where the IC fails to meet the performance specification. The electrical threshold value for each net is used to generate electrical constraints for the net.

At 404, the method includes performing a sensitivity check that provides performance impact values for the nets in the schematic netlist. In some embodiments, the sensitivity check includes: increasing an RC product value for a net until the performance of the circuit fails to meet the performance specification; measuring changes or deltas in the performance of the circuit for each increase in the RC product value; and calculating the sensitivity of the net by averaging the changes or deltas in performance. In some embodiments, a higher sensitivity indicates a higher impact on the performance of the circuit. In some embodiments, the sensitivity is the performance impact value for the net.

At 406, the method includes determining physical constraints from the electrical constraints. In some embodiments determining physical constraints from the electrical constraints includes obtaining characteristics of conductive layer tracks for meeting at least one of a resistor electrical constraint, a capacitor electrical constraint, and an electromigration current electrical constraint.

At 408, the method includes routing the nets in the schematic netlist based on the physical constraints and the performance impact values. In some embodiment, routing the nets in the schematic netlist includes routing the nets in the schematic netlist in an order that is based on at least one of the sensitivities of the nets and the performance impact values.

In some embodiments, the method further includes performing post-routing simulations based on the routing of the nets in the schematic netlist to determine if the routing meets the performance specification. If the routing fails to meet the performance specification, the method includes performing further routing to meet the electrical constraints and the performance specification.

Disclosed embodiments thus provide an electrically aware routing flow that improves the efficiency of laying out ICs, such as analog ICs. The improved layout efficiency results in shorter time-to-market, which benefits customers.

In some embodiments, the electrically aware routing flow receives or obtains a schematic netlist, a performance specification, and a layout placement. Electrical constraints are determined from the performance specification, and physical constraints are determined from the electrical constraints. Also, in some embodiments, the electrically aware routing flow includes performing a sensitivity check that provides a sensitivity and a performance impact value for each net. In some embodiments, the sensitivity value is the performance impact value.

Next, the IC is laid out based on the electrical constraints, the physical constraints, and the sensitivities and/or performance impact values. In some embodiments, post-layout simulations are performed and, if needed, the layout is rerouted, and further post-layout simulations are performed.

Disclosed embodiments further include an electrically aware routing flow that receives a schematic netlist, a performance specification, and a layout placement. Electrical constraints for nets in the schematic netlist are determined based on the performance specification, and a sensitivity check that provides sensitivities and performance impact values for the nets is performed. Next, the nets in the schematic netlist are routed with minimum lengths and in an order based on the performance impact values to provide proposed layouts. In some embodiments, the nets are routed in track-based routing with minimum lengths and in an order based on the performance impact values to provide the proposed layouts.

In some embodiments, physical constraints are determined from the electrical constraints, and the proposed layouts are checked by an electrically aware routing routine that checks nets against the electrical constraints. Nets are rerouted if they fail to meet the electrical constraints. In some embodiments, the routing and rerouting includes mesh routing to meet the electrical constraints. In some embodiments, if a resistance value of a net violates an electrical constraint or an EM current value of a net violates an electrical constraint, mesh routing is employed to meet the electrical constraint.

Electrically aware routing improves the efficiency of laying out ICs, such as analog circuit ICs. Electrically aware routing closes the performance gap between pre-layout simulations and post-layout simulations. Also, electrically aware routing provides an efficient methodology for performing design iterations, boosting design productivity, reducing time-to-market, and lowering the entry barrier for new customer engagement.

In accordance with some embodiments, a system includes computer readable storage media including executable instructions and one or more processors configured to execute the executable instructions to: obtain a schematic netlist and a performance specification for an integrated circuit; determine electrical constraints for nets in the schematic netlist based on the performance specification; determine physical constraints from the electrical constraints; rout the nets in the schematic netlist based on the electrical constraints and the physical constraints; and provide a data file of a layout.

In accordance with further embodiments, a computer-readable storage medium including executable instructions that when executed by a processor cause the processor to: receive a schematic netlist for an integrated circuit; determine electrical constraints for nets in the schematic netlist based on a performance specification; perform a sensitivity check that provides performance impact values for the nets in the schematic netlist; determine a routing of the nets in the schematic netlist by routing the nets in the schematic netlist with minimum lengths and in an order based on the performance impact values; determine a refined routing of the nets in the schematic netlist based on the electrical constraints, and physical constraints determined based on the electrical constraints; and provide a data file of a layout.

In accordance with still further disclosed aspects, a method includes: receiving a schematic netlist and a performance specification for an integrated circuit; determining electrical constraints for nets in the schematic netlist based on the performance specification; performing a sensitivity check that provides performance impact values for the nets in the schematic netlist; determining physical constraints from the electrical constraints; routing the nets in the schematic netlist based on the physical constraints and the performance impact values; and providing a data file of a layout.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
   computer readable storage media including executable instructions; and
   one or more processors configured to execute the executable instructions to:
      obtain a schematic netlist and a performance specification for an integrated circuit;
      determine electrical constraints for nets in the schematic netlist based on the performance specification;
      determine physical constraints from the electrical constraints;
      route the nets in the schematic netlist based on the electrical constraints and the physical constraints; and
      provide a data file of a layout,
      wherein to determine the electrical constraints for the nets in the schematic netlist based on the performance specification includes increasing a resistor-capacitor (RC) product value of a net to find the RC product value where the integrated circuit fails to meet a speed performance specification for the integrated circuit.

2. The system of claim 1, wherein the one or more processors are configured to execute the executable instructions to determine electrical threshold values for the nets in the schematic netlist for meeting the performance specification to determine the electrical constraints for the nets in the schematic netlist.

3. The system of claim 1, wherein the one or more processors are configured to execute the executable instructions to obtain characteristics of conductive layer tracks that meet at least one of a resistor electrical constraint, a capacitor electrical constraint, and an electromigration electrical current electrical constraint.

4. The system of claim 3, wherein the characteristics of the conductive layer tracks include at least one of a length and a width of the conductive layer tracks.

5. The system of claim 1, wherein the one or more processors are configured to execute the executable instructions to perform a sensitivity check that provides performance impact values for the nets in the schematic netlist.

6. The system of claim 5, wherein the sensitivity check includes an average of changes in speed performance of the integrated circuit in relation to increases in the RC product value.

7. The system of claim 5, wherein the one or more processors are configured to execute the executable instructions to route the nets in the schematic netlist in an order that is based on the performance impact values.

8. The system of claim 1, wherein the one or more processors are configured to execute the executable instructions to route the nets in the schematic netlist by routing the nets in the schematic netlist with minimum lengths.

9. The system of claim 1, wherein the integrated circuit includes analog circuits.

10. The system of claim 1, wherein the integrated circuit includes digital circuits.

11. A computer-readable storage medium including executable instructions that when executed by a processor cause the processor to:
    receive a schematic netlist for an integrated circuit;

determine electrical constraints for nets in the schematic netlist based on a performance specification;

perform a sensitivity check that provides performance impact values for the nets in the schematic netlist;

determine a routing of the nets in the schematic netlist by routing the nets in the schematic netlist with minimum lengths and in an order based on the performance impact values;

determine a refined routing of the nets in the schematic netlist based on the electrical constraints, and physical constraints determined based on the electrical constraints; and provide a data file of a layout, wherein to determine the electrical constraints for the nets in the schematic netlist based on the performance specification includes increasing a resistor-capacitor (RC) product value of a net to find the RC product value where the integrated circuit fails to meet a speed performance specification for the integrated circuit.

12. The computer-readable storage medium of claim 11, wherein the executable instructions cause the processor to perform post-routing simulations based on the refined routing to determine if the refined routing meets the performance specification.

13. The computer-readable storage medium of claim 12, wherein the executable instructions cause the processor to perform further routing to meet the electrical constraints and the performance specification.

14. The computer-readable storage medium of claim 11, wherein the executable instructions cause the processor to provide mesh routing to meet at least one of a resistor electrical constraint, a capacitor electrical constraint, and an electromigration electrical current electrical constraint.

15. A method, comprising:
receiving a schematic netlist and a performance specification for an integrated circuit;

determining electrical constraints for nets in the schematic netlist based on the performance specification;

performing a sensitivity check that provides performance impact values for the nets in the schematic netlist;

determining physical constraints from the electrical constraints;

routing the nets in the schematic netlist based on the physical constraints and the performance impact values; and providing a data file of a layout wherein performing the sensitivity check includes providing increases in a resistor-capacitor (RC) product value for a net, determining changes in speed performance of the integrated circuit for each of the increases in the RC product value, and averaging the changes in the speed performance of the integrated circuit to determine a sensitivity performance impact value of the net.

16. The method of claim 15, wherein routing the nets in the schematic netlist includes routing the nets in the schematic netlist in an order that is based on the sensitivity performance impact value of the net.

17. The method of claim 15, wherein routing the nets in the schematic netlist includes routing the nets in the schematic netlist in an order that is based on the performance impact values.

18. The method of claim 15, wherein determining electrical constraints for nets in the schematic netlist includes determining electrical threshold values for the nets in the schematic netlist for meeting the performance specification.

19. The method of claim 15, wherein determining physical constraints from the electrical constraints includes obtaining characteristics of conductive layer tracks to meet at least one of a resistor electrical constraint, a capacitor electrical constraint, and an electromigration electrical current electrical constraint.

20. The method of claim 15, comprising performing post-routing simulations based on the routing of the nets in the schematic netlist to determine if the routing meets the performance specification and if the routing fails to meet the performance specification, performing further routing to meet the electrical constraints and the performance specification.

* * * * *